(12) United States Patent
Akutsu et al.

(10) Patent No.: US 8,677,380 B2
(45) Date of Patent: Mar. 18, 2014

(54) LASER DIODE HOLDING MEMBER WITH POSITION ADJUSTING MEMBER

(75) Inventors: Takashi Akutsu, Ota (JP); Takao Fukumoto, Ota (JP); Yasukazu Imaizumi, Ashikaga (JP)

(73) Assignee: Sanyo Electric Co., Ltd., Osaka (JP)

( * ) Notice: Subject to any disclaimer, the term of this patent is extended or adjusted under 35 U.S.C. 154(b) by 267 days.

(21) Appl. No.: 12/840,982

(22) Filed: Jul. 21, 2010

(65) Prior Publication Data

US 2011/0067041 A1    Mar. 17, 2011

(30) Foreign Application Priority Data

Jul. 31, 2009 (JP) ................................. 2009-179572
Sep. 9, 2009 (JP) ................................. 2009-208141
Jun. 18, 2010 (JP) ................................. 2010-139501

(51) Int. Cl.
*G11B 33/14* (2006.01)

(52) U.S. Cl.
USPC .......................................................... 720/648

(58) Field of Classification Search
USPC ............ 720/648, 649, 658; 369/100, 112.01, 369/244.1, 249.1
See application file for complete search history.

(56) References Cited

U.S. PATENT DOCUMENTS

2004/0218501 A1* 11/2004 Sogawa et al. ................... 369/99
2004/0257927 A1* 12/2004 Sogawa et al. ............. 369/44.14

FOREIGN PATENT DOCUMENTS

JP         2002-170249         6/2002

* cited by examiner

*Primary Examiner* — Joseph Feild
*Assistant Examiner* — Gustavo Polo
(74) *Attorney, Agent, or Firm* — SoCal IP Law Group LLP; Steven C. Sereboff; John E. Gunther

(57) ABSTRACT

A laser diode assembly for an optical pickup includes a laser diode, a holding member, and a position adjustment member. The holding member has a housing portion formed therein. The laser diode is housed in the housing portion. The position adjustment member is disposed between the laser diode and an inner wall of the housing portion and configured to adjust a mounting position of the laser diode by abutting the inner wall and the laser diode.

13 Claims, 6 Drawing Sheets

LASER DIODE HOLDING MEMBER WITH POSITION ADJUSTING MEMBER

CROSS-REFERENCE TO RELATED APPLICATIONS

This application claims the benefit of priority to Japanese Patent Application Nos. 2009-179572, 2009-208141, and 2010-139501, filed Jul. 31, 2009, Sep. 9, 2009, and Jun. 18, 2010, respectively, of which full contents are incorporated herein by reference.

BACKGROUND OF THE INVENTION

1. Field of the Invention

The present invention relates to a mounting structure for an optical member, and a pickup apparatus and disc apparatus including the same.

2. Description of the Related Art

Related to a mounting structure for an optical member and a pickup apparatus including the same is a rotational direction position adjustment mechanism of an optical component in the optical pickup, capable of accurate position adjustment and reliably keeping the position after adjustment with a simple configuration and a low manufacturing cost, for example (see, e.g., Japanese Laid-Open Patent Publication No. 2002-170249 (pp. 1 and 3, FIGS. 1 and 2)).

Recently it has been demanded that the optical pickup apparatus, etc., are provided with the optical component/optical member with the mounting position of the optical component/optical member on the optical pickup apparatus, etc., being more accurately adjusted.

SUMMARY OF THE INVENTION

A mounting structure for an optical member according to an aspect of the present invention, includes: an optical member; a holding member having the optical member mounted thereon; and a position adjustment member disposed between the optical member and the holding member, the position adjustment member configured to adjust a mounting position of the optical member.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

An embodiment of the present invention is applicable to a pickup apparatus, a disc apparatus, a mounting structure for an optical member included therein, and a method of mounting an optical member on a holding member included therein, the pickup apparatus and the disc apparatus capable of: reproducing data, information, signals, etc., recorded in various types of media such as various types of optical discs which are provided as e.g., "CD" (Compact Disc)(trademark), "DVD" (Digital Versatile Disc) (registered trademark), "HD DVD" (High Definition DVD" (registered trademark), "CBHD" (China Blue High-Definition), "Blu-ray Disc" (registered trademark), etc.; recording data, information, signals, etc., into various types of media such as various types of writable or rewritable optical discs; and deleting data, information, signals, etc., recorded in the various types of media such as various types of writable or rewritable optical discs.

According to an embodiment of the present invention, the optical member can be mounted on the holding member with the optical member being adjusted in position using a position adjustment member.

According to an embodiment of the present invention, a pickup apparatus is configured such that the optical member can be mounted on the holding member with the optical member being adjusted in position using the position adjustment member.

According to an embodiment of the present invention, a disc apparatus is configured such that the optical member can be mounted on the holding member with the optical member being adjusted in position using the position adjustment member.

Detailed descriptions will now be given of embodiments of a mounting structure for an optical member and a pickup apparatus and a disc apparatus that include the mounting structure according to an embodiment of the present invention based on figures.

FIGS. 1 to 6 each depict a mounting structure for an optical member, and a pickup apparatus and a disc apparatus including the mounting structure, according to an embodiment of the present invention.

Figure 5:
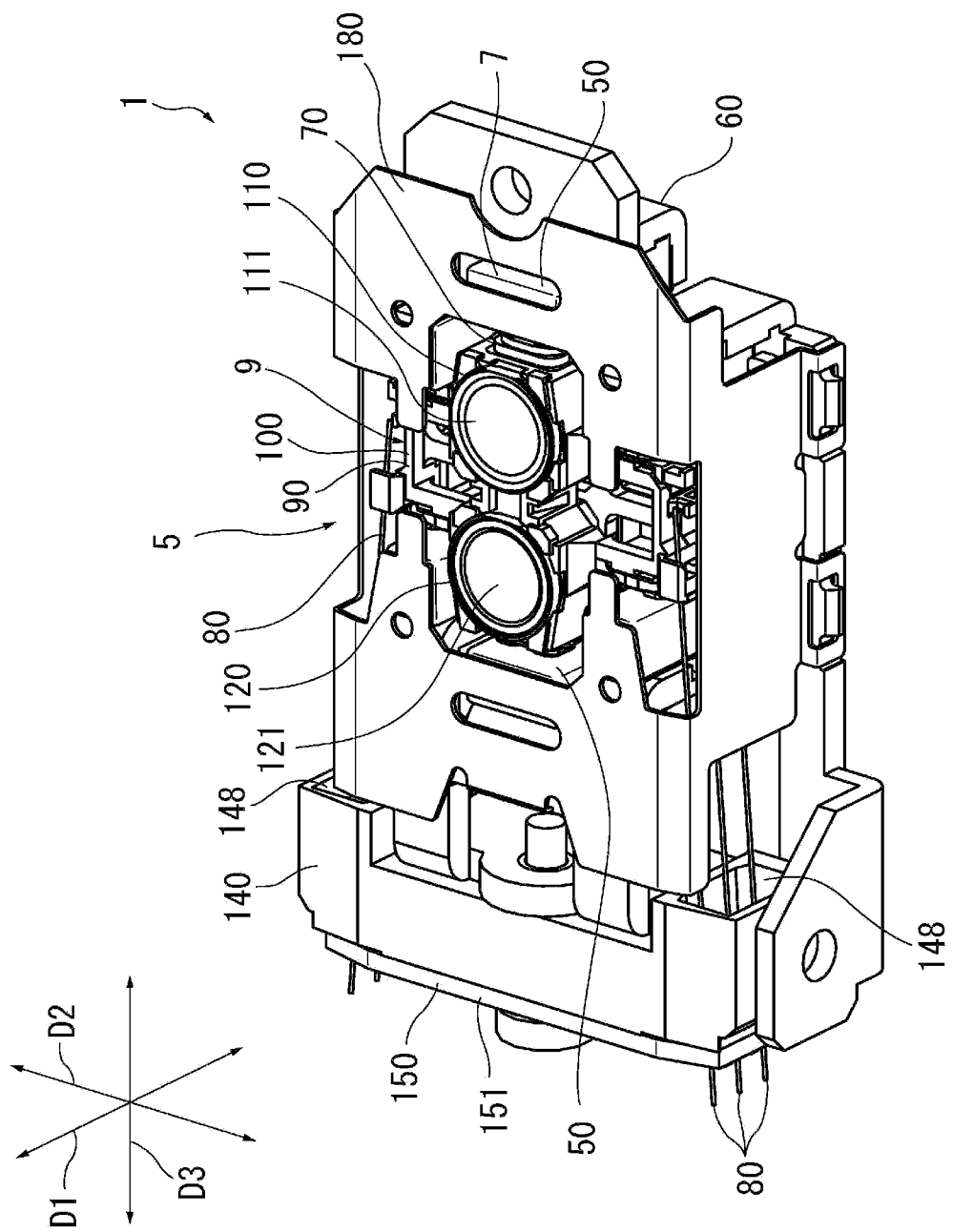
FIG. 5 is a perspective view of a pickup apparatus according to an embodiment of the present invention.

A fixed unit 7 of a driving device 5 includes a magnetic member 50 and a magnetic coupling member 60 illustrated in FIG. 5. A movable unit 9 of the driving device 5 includes a plurality of objective lenses 110 and 120, a holding member 90, a plurality of coils 70 corresponding to a plurality of magnetic members 50, a movable unit assembly 100 including the holding member 90 having the plurality of objective lenses 110 and 120, the plurality of coils 70, etc., mounted therewith, and a plurality of supporting members 80 that support the movable unit assembly 100. The driving device 5 for the objective lenses 110 and 120 of a pickup apparatus 1 is configured as an actuator 5 including the fixed unit 7 and the movable unit 9, for example.

Figure 6:
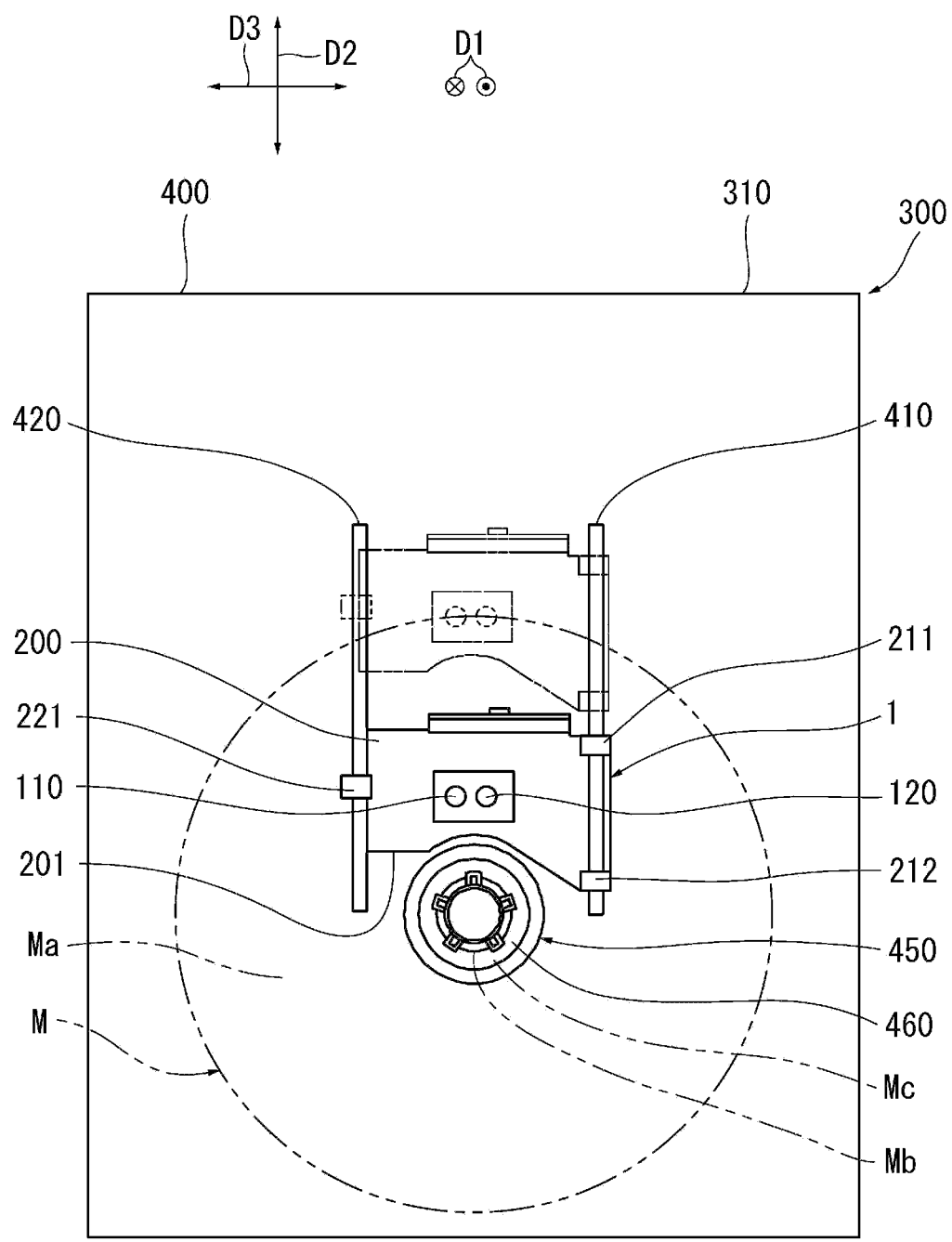
FIG. 6 is an explanatory view of a disc apparatus according to an embodiment of the present invention.

As the pickup apparatus 1 depicted in FIGS. 5 and 6, the optical pickup apparatus 1 capable of emitting laser light (LASER: light amplification by stimulated emission of radiation) is used, for example. An optical pickup or the optical pickup apparatus is abbreviated as "OPU", for example. As a disc apparatus 300 depicted in FIG. 6, an optical disc apparatus 300 capable of emitting laser light is used, for example.

As used herein, the objective lens is abbreviated as "OBL", for example. The movable unit assembly 100 including the holding member 90 (FIG. 5), i.e., so-called lens holder 90, having the two OBLs (objective lenses) 110 and 120, six coils 70, etc., mounted therewith may be called a lens holder assembly 100, for example.

The OPU 1 depicted in FIGS. 5 and 6 supports various types of media M such as various types of discs M (FIG. 6). The disc M includes an optical disc M, for example. The OPU 1 reproduces data, information, signals, etc., recorded in the various types of the media M such as the various types of the optical discs M. The OPU 1 records data, information, signals, images, etc., in the various types of the media M such as various types of writable or rewritable optical discs M. The OPU 1 supports the various types of the media M such as the various types of the optical discs M capable of deletion of data, information, signals, etc., therefrom, and deletes data, information, signals, etc., recorded in the various media M such as the various types of the optical discs M. The media mean discs, etc., having data, information, signals, etc., stored therein, for example.

The OPU 1 supports "CD" (Compact Disc)(trademark) series/standard media, "DVD" (registered trademark) (Digital Versatile Disc) series/standard media, "HD DVD" (High Definition DVD" (registered trademark) series/standard media, "CBHD" (example: former name "CH-DVD")(China Blue High-Definition) series/standard media that is media based on standards defined in China, and "Blu-ray Disc" (registered trademark) series/standard media, for example. The OPU 1 is one supporting at least one type of media selected from a group that includes the various types of the media, for example. Specifically, the OPU 1 is one supporting any one of the above described types of media.

The media M includes the above described various types of the optical discs M, etc., for example, but may include media M in the following forms. For example, the disc (M) may include an optical disc (M), etc., having signal face portions (Ma) on its both surfaces thereof which are capable of data writing/deleting, data rewriting, etc. The disc (M) may also include an optical disc (M), etc., whish are provided with e.g., a two-layered signal face portion (Ma) and are capable of data writing/deleting, data rewriting, etc. Parentheses ( ) added to reference numerals in this specification are used, for convenience, for describing slightly different ones from illustrated ones, etc. The disc (M) may also include an optical disc for "HD DVD" (not shown) having e.g., a three-layered signal face portion which is capable of data writing/deleting, data rewriting, etc. The disc (M) may also include an optical disc for "Blu-ray Disc" (not shown) including e.g., a four-layered signal face portion which is capable of data writing/deleting, data rewriting, etc. The disc (M) may further include an optical disc (M) which capable of various types of label writing, etc., by allowing laser light to be applied to a labeled face portion thereof. The signal face portion Ma and the labeled face portion of the optical disc M each include a thin layer, etc., such as a metal thin film. Data, information, signals, etc., are recorded on the signal face portion Ma including e.g., the metal thin film, and images are recorded on the labeled face portion. The signal face portion Ma of the optical disc M is configured as a signal layer Ma including e.g., the metal thin layer. Thus, the various types of the optical discs M include optical discs in various forms with a double-layer/multilayer structure. For convenience' sake, the optical discs in the various forms are brought together to be referred to as the optical disc M.

Information is recorded in the optical disc M (FIG. 6), information recorded in the optical disc M is reproduced, and information recorded in the optical disc M is deleted, using laser light that is emitted from an optical member 10 (FIGS. 1 to 3) included in a light-emitting element with an electric current being supplied to the optical member 10 included in the light-emitting element. The light-emitting element includes a semiconductor laser, for example.

The OBLs 110 and 120 of the OPU 1 are moved up and down/left and right using the actuator 5 of the OPU 1, so that the laser light is focused on the signal layer Ma of the optical disc M. Specifically, when a highly precise laser spot is applied and formed on the signal layer Ma of the optical disc M, the OBLs 110 and 120 mounted on the lens holder 90 are moved substantially in a focusing direction D1 and a tracking direction D2, and if needed, in a tilt direction, etc., using the actuator 5 in the OPU 1.

As used herein, it is assumed that directions in the present invention are directions when the optical disc M, etc., are viewed based on the actuator 5, the optical member 10, etc., included in the OPU 1, for example. Definitions of the directions, etc., in this specification are definitions, for convenience, for describing e.g., the mounting structure for the optical member 10, the OPU 1 supporting the various types of the optical discs M, and the optical disc apparatus 300 provided with the OPU 1 loaded with the various types of the optical discs M.

Figure 1:
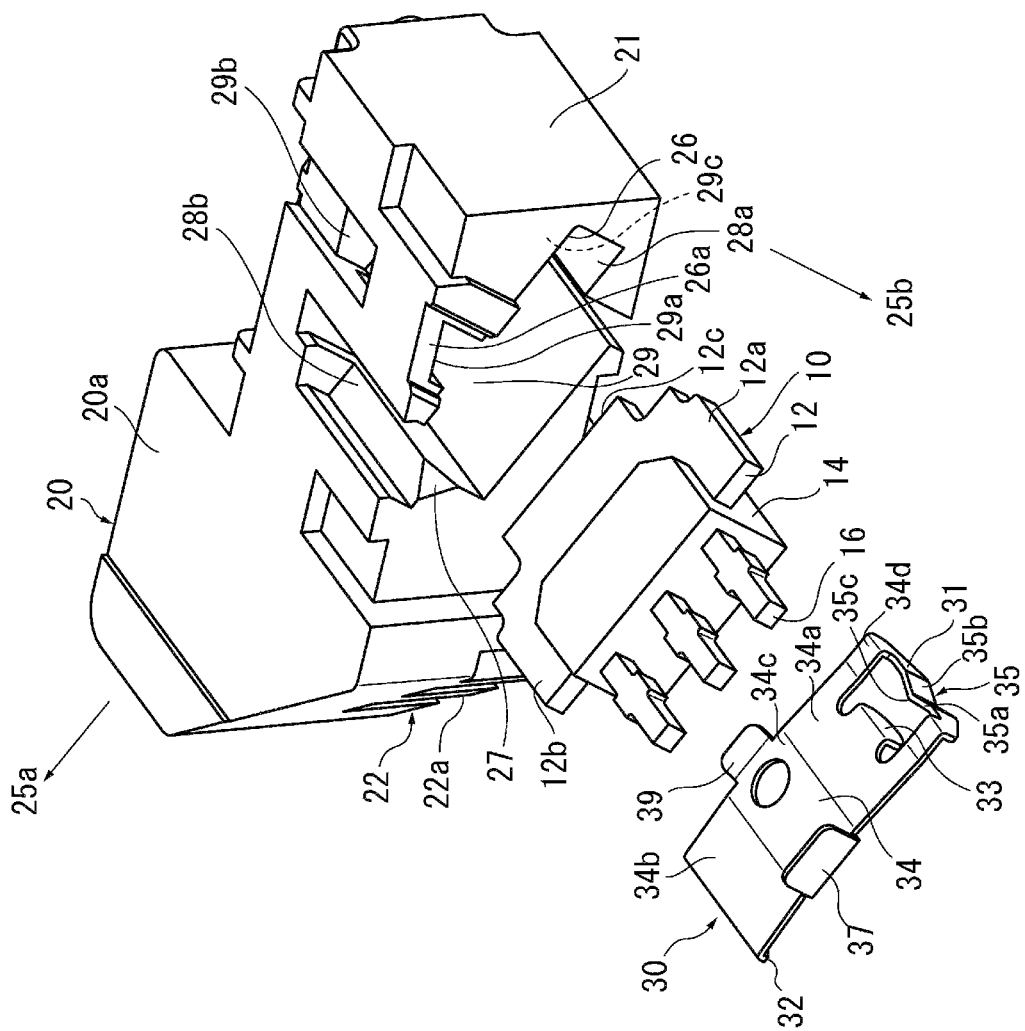
FIG. 1 is an exploded perspective view of a mounting structure for an optical member according to an embodiment of the present invention.
Figure 2:
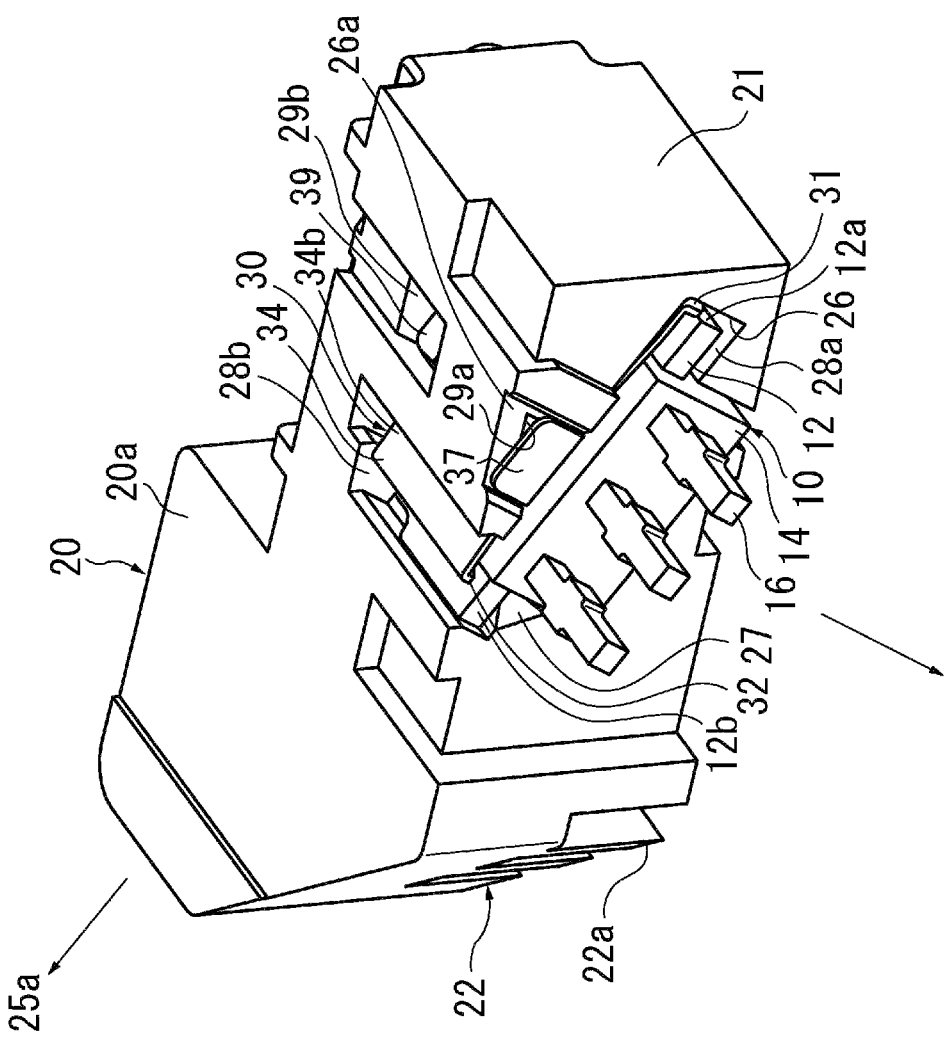
FIG. 2 is a perspective view of a mounting structure for an optical member according to an embodiment of the present invention.
Figure 3:
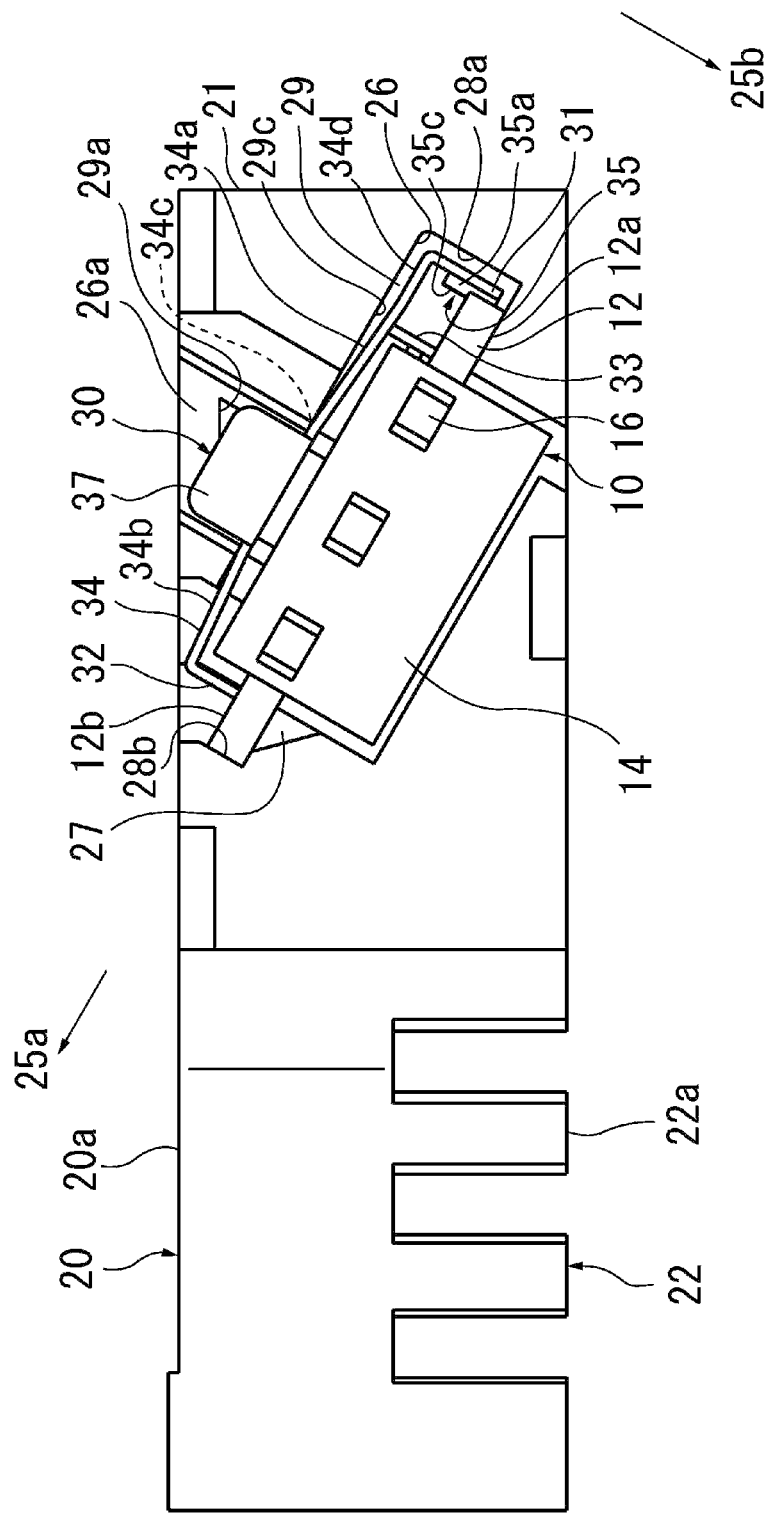
FIG. 3 is a front view of a mounting structure for an optical member according to an embodiment of the present invention.
Figure 4:
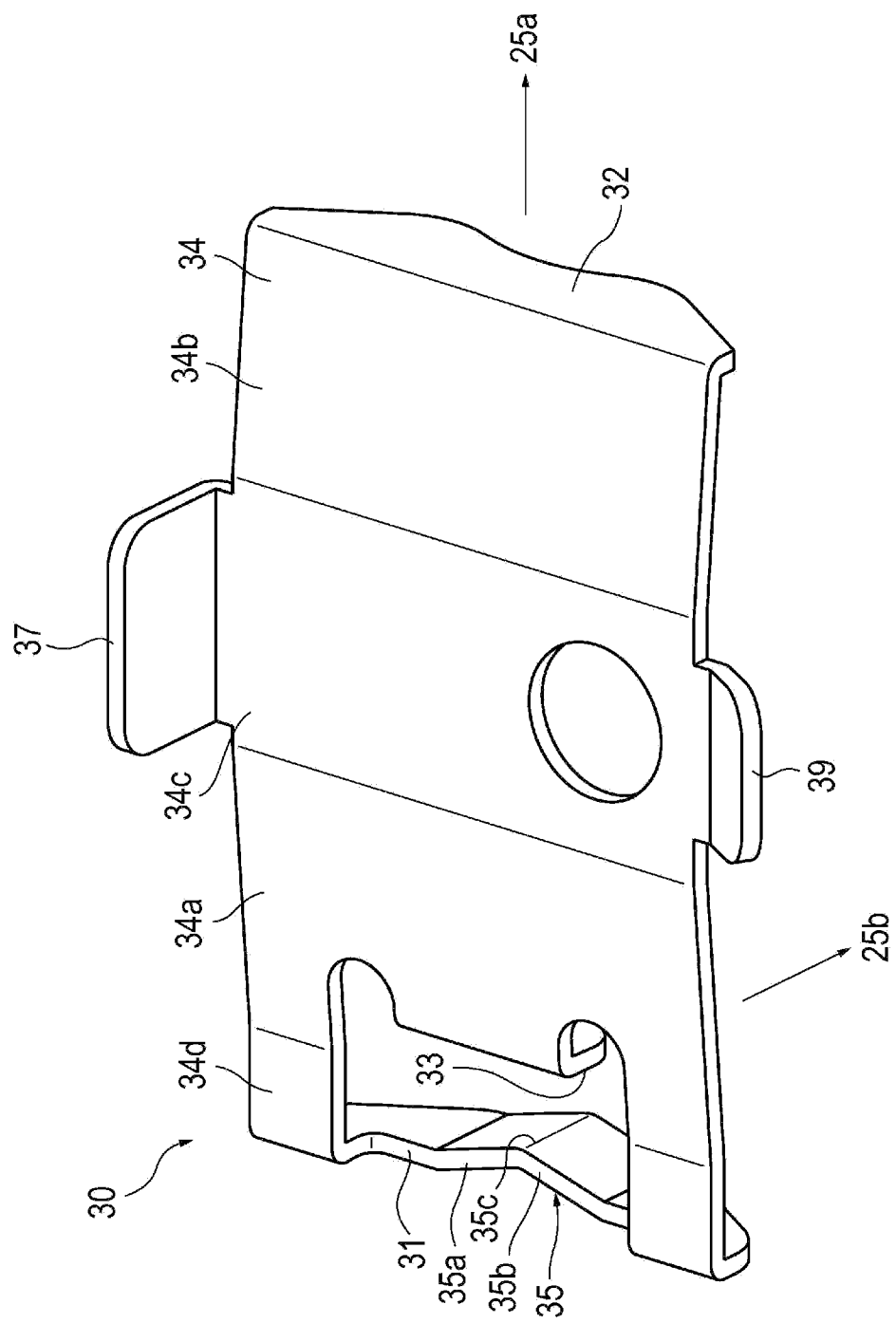
FIG. 4 is a perspective view of a position adjustment member in a mounting structure for an optical member according to an embodiment of the present invention.

The optical member 10, a position adjustment member 30, and a holding member 20 provided with the optical member 10 and the position adjustment member 30 depicted in FIGS. 1 to 3, for example, are treated respectively as the optical member 10 (FIGS. 1 to 3), however, the position adjustment member 30, and the holding member 20 of the OPU 1 of the optical disc apparatus 300 (FIG. 6) that is transversely placed, may be treated, for example, as the optical member 10 (FIGS. 1 to 3), the position adjustment member 30, and the holding member 20 of the OPU 1 of the optical disc apparatus 300 that is vertically placed (FIG. 6). Although the actuator 5 of the OPU 1 depicted in FIG. 5, for example, is treated as the actuator 5 of the OPU 1 of the transversely placed optical disc apparatus 300 (FIG. 6), it may be treated, for example, as the actuator 5 of the OPU 1 of the vertically placed optical disc apparatus 300 (FIG. 6). As used herein, definitions of "up", "down", "left", "right", "front", "rear", "deep", etc., are merely definitions for convenience' sake, for example.

When focusing of the laser light is performed with the OBLs 110 and 120, the OPU 1 executes a focusing adjustment, a tracking adjustment, and if necessary, a tilt adjustment. The focusing adjustment, the tracking adjustment, and the tilt adjustment are executed substantially at the same time, for example.

"Focus" means a focal point or a focal point of lens, for example. "Focusing" means bringing into focus or being brought into focus. "Track" means a signal track on the optical disc, for example. "Tracking" means following and observing a micro signal portion provided on the signal face of the optical disc using light, to locate a track described in a substantially helical shape. "Tilt" in the optical disc apparatus or the optical pickup apparatus means angular displacement between the disc surface and the objective lens optical axis.

For example, when focus servo control of the lens/holder assembly 100 including the lens holder 90 mounted with the OBLs 110 and 120 is performed with respect to the optical disc M, the lens/holder assembly 100 including the lens holder 90 mounted with the OBLs 110 and 120 is moved along the up and down direction (focusing direction) D1. When tracking servo control of the lens/holder assembly 100 including the lens holder 90 mounted with the OBLs 110 and 120 is performed with respect to the optical disc M, the lens/holder assembly 100 including the lens holder 90 mounted with the OBLs 110 and 120 is moved along the left and right direction (tracking direction) D2 relative to a direction of a line of the substantially helical track (not shown) of the optical disc M. "Servo" or "servomechanism" means a mechanism for measuring the state of an object to be controlled and comparing the measurement with a reference value to allow automatic adjustment control to be performed. When laser light condensed by the OBLs 110 and 120 is focused on the signal layer Ma of the optical disc M, the lens/holder assembly 100 including the lens holder 90 mounted with the OBLs 110 and 120 is driven in the up-and-down and left-and-right directions by the actuator 5.

Although in a case of the OPU 1 depicted in FIGS. 5 and 6, the pair of OBLs 110 and 120 are mounted side by side on the lens holder 90 substantially along a tangential direction D3 that is a direction orthogonal to the focusing direction D1 that is a direction substantially along the optical axis direction D1 of the OBLs 110 and 120 and to the tracking direction D2 that is a direction substantially along a radial direction D2 of the optical disc M, a pair of OBLs (110 and 120) may be mounted side by side on a lens holder (90) substantially along a tracking direction (D2) that is a direction substantially along a radial direction (D2) of an optical disc (M), for example, depending on designs/specifications of an optical disc apparatus (10), an OPU (1), etc. A single OBL in place of the plurality of OBLs (110 and 120) may be mounted on the lens holder (90).

The OPU 1 of FIG. 5 includes the optical member 10 (FIGS. 1 to 3), i.e., a so-called laser diode (LD), which applies laser light to the optical disc M (FIG. 6). The OPU 1 includes the holding member 20, i.e., a so-called holder 20, which holds the LD 10. Since the laser diode (LD) 10, etc. are housed in a housing portion 29 of the holder 20, the holder 20 is called a laser holder 20, an LD holder 20, etc., for example. The OPU 1 includes a drive circuit unit, i.e. a so-called laser driver (LDD: LD driver) (not shown), that supplies an electric signal to the LD 10 to cause the LD 10 to emit light.

The OPU 1 includes a flexible circuit board such as a flexible flat circuit and a flexible printed circuit for electrically connecting electrical parts of the LD 10, etc., and electrical parts of the LDD, etc (all not shown). The flexible flat circuit (flexible flat cable) is abbreviated as "FFC". The flexible printed circuit (flexible printed cable) is abbreviated as "FPC". The FPC is configured by printing a plurality of circuit conductors on an insulating sheet made of an aromatic heat-resistant synthetic resin such as a wholly aromatic polyimide (PI) resin that has an excellent heat resistance, etc., at the time of soldering, etc; by juxtaposing metal foil such as copper foil on the insulating sheet; and by providing a transparent or semitransparent protective layer thereon (all not shown).

For example, an electric signal is supplied from the LDD not shown through the FPC to the LD 10 so that laser light is emitted from the LD 10. Laser light is emitted from the LD 10 which is of 0.2 mW to 1000 mW for "CD" capable of emitting infrared laser light having a wavelength of about 765 nm to 840 nm (nanometers) with its reference wavelength of about 780 nm, for example. Laser light is emitted from the LD 10, which is of 0.2 mW to 1000 mW for "DVD" a capable of emitting red laser light having a wavelength of about 630 nm to 685 nm with its reference wavelength of about 635 nm or 650 nm, for example. The LD 10 is configured as a two-wavelength LD 10 capable of emitting first-wavelength laser light having a wavelength of substantially 765 nm to 840 nm with its reference wavelength of substantially 780 nm and second-wavelength laser light having a wavelength of substantially 630 nm to about 685 nm with its reference wavelength of substantially 635 nm or 650 nm, for example.

Depending on designs/specifications, etc., of the optical disc apparatus 300, the OPU 1, etc, the LD (10) emits laser light of 0.2 mW to 1000 mW for "CBHD", "HD DVD", and "Blu-ray Disc" capable of emitting blue-violet laser light, with its reference wavelength of about 405 nm, having a wavelength of about 340 nm to 450 nm, preferably, from about 380 nm to 450 nm, more preferably, greater than about 400 nm and smaller than or equal to 450 nm, for example. In this case, the LD (10) is configured as a special LD (10) capable of emitting laser light of a plurality of different wavelengths, i.e., first-wavelength laser light having a reference wavelength of substantially 780 nm with its emission wavelength of substantially 765 nm to 840 nm, second-wavelength laser light having a reference wavelength of substantially 635 nm or 650 nm with its emission wavelength of substantially 630 nm to 685 nm, and third wavelength laser light having a reference wavelength of substantially 405 nm with its emission wavelength of substantially 340 nm to 450 nm, for example. As the LD 10, various types of LDs can be used such as a single-wavelength LD (10) capable of emitting laser light of the above-described wavelengths. As the LD, an LD can be used which is capable of emitting laser light of at least one of the above-described wavelengths.

Laser light is emitted from the LD 10, which has an output value greater than or equal to 0.2 mW and smaller than or equal to 1000 mW, specifically, greater than or equal to 0.5 mW and smaller than or equal to 800 mW. For example, if laser light has an output value of smaller than 0.2 mW, then the amount becomes insufficient of the laser light that reaches a light-receiving element not shown after being applied to the optical disc M and reflected therefrom. When reproducing data, etc., of the optical disc M, the sufficient output value of the laser light is a value of from several mW to several tens of mW, specifically, e.g., a value of greater than or equal to 0.2 mW, preferably a value of greater than or equal to 0.5 mW and smaller than or equal to 20 mW. When writing data, etc., to the optical disc M at a high speed, the pulsed laser light may be required which has an high output value of from several tens of mW, specifically, 200 mW, 400 mW, 600 mW, 800 mW, 1000 mW, etc., may be needed, for example.

The OPU 1 includes the pair of OBLs 110 and 120 that condense laser light to apply and form a condensed spot on the signal layer Ma of the optical disc M. The OBL 110 is formed as a convex lens 110 with a curved face portion substantially convexed toward the interior of the OPU 1. An upper surface portion 111 of the OBL 110 is formed in a substantially planar manner, for example, but the upper surface portion 111 of the OBL 110 may be formed in a substantially convexed or formed in a substantially concaved manner, for example. The OBL 120 is formed as a convex lens 120 with a curved portion that is substantially convexed toward the interior of the OPU 1, for example. An upper surface portion 121 of the OBL 120 is formed in a substantially planar manner, for example, but the upper surface portion 121 of the OBL 120 may be formed in a substantially convexed or formed in a substantially concaved manner, for example.

The OBLs 110 and 120 are formed based on the injection molding method by using a transparent or semitransparent thermoplastic heat-resistant synthetic resin material which is injection-moldable, for example. Specifically, the OBLs 110 and 120 are formed based on the injection molding method using a composition including, as a base material, an acrylic/methacrylate resin with high transparency which is excellent in weather resistance, mirror smoothness, precision, etc., for example. A formal name of the methacrylate resin is polymethyl methacrylate that is abbreviated to e.g., PMMA. The methacrylate resin may also be referred to as acrylic resin. The OBLs 110 and 120 are formed by using a composition including, as a base material, e.g., a polycarbonate (PC) resin which has excellent processability and may is reduced in price.

The weight reduction of the OBLs 110 and 120 is achieved by using e.g., the synthetic resin material to form the OBLs 110 and 120. The substantially convex lens shaped synthetic resin OBLs 110 and 120 are mass-produced with high efficiency based on the injection molding method. The feasibility of the mass-production of the OBLs 110 and 120 enables the price reduction of the OBLs 110 and 120. Depending on designs/specifications, etc., of the optical disc apparatus 300, the OPU 1, etc., the semitransparent or transparent synthetic resin material may be replaced by a semitransparent or transparent glass material to form an OBL (110) and/or an OBL (120).

The OPU 1 includes the lens holder 90 making up the lens/holder assembly 100. The lens holder 90 is formed based on the injection molding method, which is excellent in mass-productivity, using a highly-moldable heat-resistant thermoplastic synthetic resin material having an aromatic ring. Specifically, the lens holder 90 is formed using e.g., the composition including, as a base material, a liquid crystal polymer (LCP), which is excellent in thin-wall/precision moldability, heat resistance and the like at the time of soldering, etc., and injection moldability, and which is more capable of weight reduction than an iron material, etc. The liquid crystal polymer includes e.g., a wholly aromatic liquid crystal resin excellent in heat resistance. Forming the lens holder 90 based on the injection molding enables mass production of the lens holder 90 at high efficiency even though the lens holder 90 is in a complicated shape.

The OPU 1 includes a light-receiving element, i.e., a so-called photodetector, or a PDIC (photo diode IC) or a photodetector (PD) (not shown), for receiving laser light reflected from the signal layer Ma of the optical disc M. The PD not shown is configured including at least three light-receiving portions, which are i.e., a main light-receiving portion (not shown) of a substantially rectangular shape in plan view corresponding to a main beam (0-order light) having passed through a plural-split diffraction grating (not shown) such as a four-split type; and a pair of sub light-receiving portions (not shown), each in a substantially rectangular shape in plan view, corresponding to a pair of sub beams (±1st-order diffracted light fluxes) that are diffracted and split by passing through the diffraction grating (not shown). The main light-receiving portion in the rectangular shape in plan view includes substantially four segments each in a substantially rectangular shape in plan view by being substantially uniformly split into four. Each of the sub light-receiving portions in a substantially rectangular shape in plan view includes four segments each in a substantially rectangular shape in plan view by being substantially uniformly split into four. The OPU 1 is thus provided with the PD including the plural-split type light-receiving portions each having a plurality of segments in a substantially rectangular shape in plan view. "Segment" means e.g., a portion or a fragment that is one of those obtained by splitting the whole. The PD is provided as one for receiving laser light reflected from the signal layer Ma of the optical disc M, converting a signal as such into an electrical signal, and detecting data, information, signals recorded on the signal layer Ma of the optical disc M. The PD is also provided as one for receiving laser light reflected from the signal layer Ma of the optical disc M, converting a signal as such into an electrical signal, and actuating the servo mechanism of the lens/holder assembly 100 including the lens holder 90 with the OBLs 110 and 120 making up the OPU 1. For instance, with the use of the OPU 1, when reading data/information/signals recorded in the optical disc M, writing data/information/signals to the optical disc M, or deleting data/information/signals recorded in the optical disc M, laser light is applied to the light-receiving portions of the PD, so as to detect a main information signal of the optical disc M and a focus error signal, a tracking error signal, etc., with respect to the optical disc M.

A focusing detection method of the condensed spot on the optical disc M in the OPU 1 includes a detection method based on an astigmatic method, for example. The astigmatic method is a method of detecting displacement of the condensed spot by e.g., detecting image distortion of a point image imaged by an optical system with astigmatism. The focusing detection method includes a detection method based on a differential astigmatic method, for example. The differential astigmatic method is provided as a method of generating a focus error signal by subtracting a focus error signal, which is generated in a sub-spot and obtained by multiplying a predetermined coefficient, from a focus error signal, which is generated in a main spot, for example, thereby suppressing the push-pull leakage to become smaller. The focusing detection method of the condensed spot in the OPU 1 is provided as a detection method based on the differential astigmatic method, for example. Further, as the focusing detection method, detection method such as a Foucault method or a knife-edge method may be used singly or in combination. Depending on the types of the optical discs M, the focusing method/methods such as the differential astigmatic method is/are properly and automatically selected.

The tracking detection method of the condensed spot on the optical disc M in the OPU 1 includes a detection method based on a differential push-pull (DPP) method. The differential push-pull method is a method of detecting displacement of the condensed spot using a main beam for reading/writing data and two sub-beams for detecting a position-displacement correction signal, for example. The tracking detection method includes a detection method based on a DPD (Differential Phase Detection) method including a phase difference method, for example. Specifically, the tracking detection method includes the phase difference method based on a phase difference signal detected by a four-split type photodetector. As the tracking detection method of the condensed spot in the OPU, the detection method/methods based on the DPP method, the DPD method, the phase difference method, a heterodyne wave-detection method, etc., for example, is/are used singly or in combination. Depending on the types of the optical discs M, the tracking detection method/methods such as the phase difference method is/are properly and automatically selected. Another detection method such as a three-beam method, for example, may be employed as the tracking detection method.

The OPU 1 includes the plurality of substantially rectangular plate-shaped magnetic members 50, e.g., magnets 50. The magnetic members 50 corresponding to the coils 70 include magnets, magnet steels, etc., for example. Specifically, the magnetic members 50 corresponding to the coils 70 are formed using the magnets/magnet steels, for example. The magnetic members 50 are formed using a permanent magnet material, for example. The magnet is a magnetic material containing, as its main component, iron or iron oxide, for example. The magnetic members 50 are formed using a ferrite magnet containing iron oxide, barium, strontium, etc., for example. The magnetic members may also be formed using a rare-earth/alloy magnet containing iron, chrome, cobalt, samarium, neodymium, boron, etc., or magnet steel, for example. The magnet steel is provided as alloy steel obtained by adding, to iron, etc., alloy elements such as chrome, aluminum, nickel, and cobalt, and provided as, e.g., an alloy magnet which is capable of forming process such as rolling and has permanent magnet properties of high coercive force and high remanent magnetic flux density as a result of quenching, precipitation hardening, etc.

The substantially flat-plate-shaped magnetic member 50 is formed using e.g., a ferrite magnet, a rate-earth magnet, a plastic-formed magnet, a cast magnet, a bonded magnet, or a special magnet. For instance, a polyvinyl chloride magnet, a rubber magnet, a plastic magnet, the bonded magnet such as a rare-earth bonded magnet, etc., may be used to form the substantially flat-plate-shaped magnetic member 50, depending on the mounting structure for the magnets 50, the design/specification of the OPU 1, the bonding method of the magnets 50 and the yoke 60 (magnetic coupling member), etc.

A permanent magnet material is used to form the magnets 50, for example. For instance, the magnets 50 are formed using the ferrite magnet that is inexpensive, hard to be demagnetized due to its high coercive force, and of a high corrosion resistance. Using, e.g., the inexpensive ferrite magnet as the magnet 50 prevents the great price increase thereof, with the sensitivity of the coils 70 to the magnet 50 being kept at a desired level and with the sensitivity of the coil 70 to the magnet 50 not being lowered.

A single bipolar magnet is used which has a positive pole portion formed on one surface at one side thereof and a negative pole portion formed on the one surface at the other side thereof, for example. Depending on the mounting structure for the magnets 50, the design/specification of the OPU 1, the bonding methods of the magnets 50 and the yoke 60, etc., monopolar/bipolar magnets or multipolar magnetization magnets each having two or more magnetized poles may be used as the magnetic members 50, for example.

The OPU 1 includes, e.g., the substantially U-shaped magnetic coupling member 60, e.g., the yoke 60, which is provided with at least a plurality of, preferably an even number of, such as a pair of, substantially rectangular plate-shaped magnets 50. "Yoke" means one that provides structural support to the magnetic coupling. The yoke serves to reduce leakage of magnetic force caused by the magnetic members such as magnets. For instance, a back yoke 60 provided with the magnets 50 is used herein as the yoke 60. The back yoke 60 may be treated as a frame yoke 60, for example. "Frame" means a frame, a framework, or framing, for example. The frame yoke is formed as a frame with a function of the yoke.

The yoke 60 provided with the magnetic members 50 such as the magnets/magnet steels is formed using a metal material that attracts a magnetic material. For instance, a thin-walled steel plate such as a rolled steel plate (both not shown) is subjected to press metal molding process such as punching process, bending process, and pressing process, so as to form the yoke 60. Specifically, the yoke 60 is formed using a metal material plate containing, as its main component, iron such as a rolled steel plate and being punched and/or bent by a pressing machine (all not shown). The metal material plate containing iron as its main component includes a stainless steel plate, the rolled steel plate, a band steel, etc., for example. For example, a cold rolled steel plate and/or the band steel includes SPCC, SPCD, SPCE, etc., specified based on "JIS G 3141".

The OPU 1 includes an adhesion member, e.g., an adhesive (not shown) for adhering/joining/fixing the plurality of substantially rectangular plate-shaped magnets 50 to the substantially U-shaped yoke 60 or for adhering/joining/fixing the optical member 10, the holding member 20, and the position adjustment member 30 to one another without being separated. The adhesive not shown includes a resin/polymer such as a one-component and/or two-component epoxy resin, acrylic resin, urethane resin, and methacrylate resin. For instance, any one of the resins/polymers selected from the above group of resins is used as a polymer/main component making up the one-component and/or two-component adhesive. The epoxy resin, the urethane resin, a thermosetting acrylic resin, etc., are provided as a thermosetting resin/polymer, for example. A curing agent for the main component of the two-component polymer includes polymers such as polythiol and amine materials such as polyamide amine, modified polyamine, tertiary amine, etc., for example. For instance, any one of the polymers selected from the above group of polymers is used as the curing agent making up the two-component adhesive. The one-component polymer adhesive is excellent in adhesion workability, for example, while the two-component polymer adhesive has superior price advantage in an adhesive, for example.

As the adhesive, an electron beam curing adhesive may be used which has a property of curing in response to irradiation of the electron beam such as light, for example. Specifically, as the adhesive, an ultraviolet-curing adhesive may be used which has a property of curing in response to irradiation of the ultraviolet light. More specifically, as the adhesive, an ultraviolet-curing adhesive may be used which has a property of curing in response to irradiation of the ultraviolet light as well as has a thermosetting property. Further, the thermosetting adhesive and the ultraviolet-curing adhesive can be used in combination.

The OPU 1 includes a plurality of substantially linear metal elastic support members 80, i.e., substantially linear metal suspension wires 80 that are provided in the substantially box-shaped lens/holder assembly 100 elastically support the lens/holder assembly 100. Each of the substantially linear suspension wires 80 making up the OPU 1 extends substantially along the tangential direction D3 orthogonal to the focusing direction D1, which is substantially along the optical axis direction D1 of the OBLs 110 and 120, and to the tracking direction D2, which is substantially along one radial direction D2 of the optical disc M, for example. Depending on the rotational position, etc., of the optical disc M, for example, the tangential direction D3 represents another radial direction D3 of the optical disc M. An electric signal serving as a drive signal, a control signal, etc., is supplied to the even number of suspension wires 80, which are at least four, preferably, six, etc., thereof are provided at left and right, of the even number of suspension wires 80 which are six thereof are provided in the lens/holder assembly 100 of the OPU 1. This causes the an electric signal serving as the drive signal, the control signal, etc., to be passed through the even number of coils 70, which are at least four, preferably six thereof, mounted on the lens/holder assembly 100 of the OPU 1 and electrically connected to the suspension wires 80.

Each of the substantially linear suspension wires 80 is formed using a conductor made of phosphor bronze, for example. An element wire making up the suspension wire 80 is formed using a piano wire material specified based on "JIS G 3402", a piano wire specified based on "JIS G 3522", and a hard steel wire specified based on "JIS G 3521", etc., for example. The suspension wire 80 is composed using a copper-plating conductor for which plate processing is performed based on electroplating, for example. Specifically, a copper wire or a piano wire having superior spring durability, fatigue strength, etc., is coated with a highly conductive copper (Cu), to compose the electrically conductive suspension wire 80.

The OPU 1 includes a substantially gelled damping material (not shown) made of a synthetic polymer, which suppresses abnormal vibrations, etc., occurring on the suspension wires 80, and a damping holding member 140 made of a synthetic resin, which holds the damping material, for example. Each of the suspension wires 80 is inserted through each of holes 148 of the synthetic resin damping holding member 140 mounted on the metal back yoke 60 at the rear thereof. The holes 148 of the damping holding member 140, through which the suspension wires 80 are inserted, are filled with a highly flexible damping material made of a synthetic polymer, i.e., damping agent, for example. The damping holding member 140 is formed using a synthetic resin material having excellent insulating properties. The damping holding member 140 is formed using a synthetic resin material, such as a polycarbonate resin based on the injection molding method excellent advantageous for mass-productivity, for example.

The OPU 1 includes a circuit board 150 provided with the metal suspension wires 80 that are electrically connected thereto. The circuit board referred to as PWB (printed wired board/printed wiring board), etc., for example. A board body 151 of the PWB 150 is formed using a synthetic resin material having excellent insulation properties. A circuit conductor (not shown) on the synthetic resin board body 151 is formed as a highly conductive metal foil. The synthetic resin board body 151 having the metal circuit conductor not shown formed thereon is coated with a synthetic resin material having excellent insulation properties, to form an insulating film (not shown) on the synthetic resin board body 151 having the metal circuit conductors formed thereon.

The OPU 1 includes a heat-dissipating member, e.g., a heat-dissipating agent (not shown), which is applied to heat generating portions of the optical member 10, the circuit board 150, etc. The heat-dissipating agent not shown includes a silicone grease for heat dissipation, a silicone potting material for heat dissipation, a coating material, a surface-hardening heat-dissipating silicone, a silicone adhesive for heat dissipation, etc., for example.

The OPU 1 includes a solder material for securely connecting the coils 70, etc. and the suspension wires 80, etc., in an electrically conductive manner. Further, the OPU 1 includes a solder material for securely connecting the suspension wires 80, etc., and the PWB 150, etc., in an electrically conductive manner. Environment-conscious solder not containing lead, i.e., lead-free solder is employed as a solder material to be used for soldering the coils 70, the suspension wires 80, etc. Using the lead-free solder as the solder material prevents the lead from adversely affecting the natural environment when the OPU 1 or the optical disc apparatus 300 including the OPU 1 is disassembled or scrapped, for example.

The OPU 1 includes a covering plate 180 for protecting various parts of the OPU 1. When the OPU 1 is assembled, the covering plate for protecting the various parts is provided on the OPU 1 at the upper side thereof, for example. The covering plate 180 is formed by press molding using a thin-walled metal plate having excellent heat-dissipation properties, for example. In place of the thin-walled metal covering plate 180, a black covering plate (180) made of a synthetic resin may be provided in the OPU 1 at the upper side thereof, for example.

The OPU 1 includes a housing 200 (FIG. 6) for housing various types of optical components, electrical components, driving components, etc. "Housing" means a box, box-shaped object or, or an object similar to a box for housing the devices, components, etc., for example. The housing 200 is formed using a metal material excellent in heat-dissipation properties or a resin material excellent in slide properties, for example.

The optical components housed in the housing 200 include a laser diode (LD), a half-wave plate ($\frac{1}{2}\lambda$ plate), an aperture-limited wideband quarter-wave plate ($\frac{1}{4}\lambda$ plate), a liquid-crystal correction device (LCD), a diffraction optical element (DOE), a diffraction grating (inline grating), a divergent lens, a prism, a polarizing beam splitter, a dichroic filter, a collimating lens, a beam expander lens, a half mirror, a reflection mirror, a total reflection mirror, an objective lens, a front monitor diode, a sensor lens, an anamorphic lens, an intermediate lens, and a photodetector, for example. The OPU 1 includes these optical components.

The electrical components housed in the housing 200 include a printed-circuit board, a storage device (ROM: read-only memory), a suspension wire, a coil, an actuator, a flexible printed circuit, a connector, a laser driver, a laser diode, a liquid-crystal correction device, a beam expander unit provided with a collimating lens, etc., a front monitor diode, and a photodetector, for example. The OPU 1 includes these electrical components.

The driving parts components in the housing 200 include a suspension wire, a coil, a magnet, a yoke, an actuator, an objective lens, a lens holder, and a beam expander unit provided with a collimating lens, etc., for example. The OPU 1 includes these driving components.

The various types of components such as the various types of optical components, electrical components, and driving components, which are making up the OPU 1, are housed in the housing 200 made of a metal or a synthetic resin. The housing 200 includes: a housing body 201 for housing such various types of components as the various types of optical components, electrical components, and driving components; a pair of bearing portions 211 and 212 for a main shaft that project from the housing body 201 and are movably mated with a first shaft member 410; and a bearing portion 221 for sub-shaft that projects from the housing body 201 toward a direction opposite to that in the case of the bearing portions 211 and 212 for main shaft, and is movably mated with a second shaft member 420. The bearing portions 211 and 212 for main shaft and the bearing portion 221 for sub-shaft are formed integrally with the housing body 201. The bearing portions 211 and 212 for main shaft, the bearing portion 221 for sub-shaft, and the housing body 201 are formed as a single assembly using the same metal material or the same synthetic resin material, for example.

The housing 200 making up the OPU 1 is formed using a nonferrous metal containing at least one element selected from a group of aluminum (Al), magnesium (Mg), and zinc (Zn), a metal such as a die cast alloy, etc., for example. Aluminum, magnesium, and zinc are excellent in corrosion resistance and are nonferrous metal having a specific gravity smaller than iron. The housing 200 is formed using a nonferrous metal material such as an aluminum alloy containing aluminum as a main component thereof, for example.

Alternatively, the housing 200 making up the OPU 1 is formed using a heat-resistant synthetic resin composition containing a base material of a polyarylene sulfide (PAS) resin such as polyphenylene sulfide (PPS) resin, that is excellent in mechanical properties, slide properties, dimensional stability, heat resistance, injection moldability, electrical properties including insulation properties, etc., and that is capable of more weight reduction than an iron material, etc., for example. A resin material is smaller in specific gravity than iron, and suitable for weight reduction.

When the OPU 1 moves substantially along a longitudinal direction D2 of the substantially round rod-shaped shaft members 410 and 420, the substantially round hole-shaped first bearing portion 211 is brought into sliding contact with the substantially round-rod-shaped first bearing portion 410. When the OPU 1 moves substantially along the longitudinal direction D2 of the substantially round rod-shaped shaft members 410 and 420, the substantially round hole-shaped second bearing portion 212 is brought into sliding contact with the substantially round-rod-shaped first bearing portion 410. When the OPU 1 moves substantially along the longitudinal direction D2 of the substantially round rod-shaped shaft members 410 and 420, the third bearing portion 221 having a laid-down substantially U-shaped sliding bearing structure is brought into sliding contact with the substantially round-rod-shaped second shaft member 420. The longitudinal direction D2 of the substantially round rod-shaped shaft members 410 and 420 is the direction D2 in which the OPU 1 is moved from the side of an inner periphery toward an outer periphery of the optical disc M and/or is the direction D2 in which the OPU 1 is moved from the outer periphery toward the inner periphery of the optical disc M.

The shaft members 410 and 420 are formed as slide shafts 410 and 420, for example, which are capable of coming in sliding contact with the bearing portions 211, 212, and 221 of the housing 200 of the OPU 1. The shaft members 410 and 420 are formed from using "hot-finished stainless steel rod" specified based on "JIS G 4304", "cold-formed stainless steel rod" specified based on "JIS G 4318", etc., for example. The bearing portions 211, 212, and 221 are formed as sliding portions 211, 212, and 221 capable of coming in sliding contact with the slide shafts 410 and 420, for example.

The OPU 1 is movably supported on the pair of slide shafts 410 and 420 with the aid of a stable substantially three-point structure provided by the first sliding portion 211, the second sliding portion 212, and the third sliding portion 221 of the housing 200. Since the OPU 1 is movably supported on the pair of slide shafts 410 and 420 by main three points thereof with the first sliding portion 211, the second sliding portion 212, and the third sliding portion 221 of the housing 200, the OPU 1 has less friction than an OPU (not shown) having a four-point support structure (not shown), for example.

Since the third sliding portion 221 made up having an opened laid-down substantially U-shaped bearing structure, a work is facilitated of mounting the OPU 1 onto the slide shaft 420 that is the sub-shaft, for example. Since the third sliding portion 221 is made up having the opened laid-down substantially U-shaped bearing structure, the third sliding portion 221 of the opened laid-down substantially U-shaped bearing structure absorbs a minute error in parallelism, etc., of the second slide shaft 420 that is the sub-shaft relative to the first slide shaft 410 that is the main shaft, for example.

The mounting structure for the optical member 10 depicted in FIGS. 1 to 3 includes: the optical member 10, the holding member 20 provided with the optical member 10, and the elastic position adjustment member 30 that intervenes between the optical member 10 and the holding member 20 and is capable of automatically adjusting the mounting position of the optical member 10.

The optical member 10 is a light-emitting element capable of emitting laser light, i.e., a semiconductor laser. The light-emitting element such as the semiconductor laser includes a light-emitting portion 12 that emits laser light, a body portion 14 that supports the light-emitting portion 12, and a plurality of terminal portions 16 that is protruded from the body portion 14.

Specifically, the optical member 10 is provided as a substantially plate-shaped frame type laser diode 10.

The holding member 20 is a metal and/or resin holder 20 capable of accommodating the optical member 10 and/or the elastic position adjustment member 30. The holding member 20 includes a body portion 21 including the housing portion 29 into which the optical member 10 and/or the elastic position adjustment member 30 are inserted, and a heat-dissipating portion 22 including a plurality of fins 22a for efficiently dissipating heat generated from the optical member 10. The substantially rectangular box-shaped body portion 21 of the holding member 20 includes an opening 26 tilted relative to a reference surface portion 20a of the holding member 20, for example. The substantially rectangular box-shaped body portion 21 of the holding member 20 includes the housing portion 29 tilted relative to the reference surface portion 20a of the holding member 20, for example.

The opening 26 of the holding member 20 includes amounting facilitating portion 27 for facilitating the inserting of the optical member 10 and/or the elastic position adjustment member 30.

A pair of guiding portions 28a and 28b for facilitating the insertion of at least the optical member 10 is provided inside the housing portion 29 of the holding member 20. For instance, the pair of guiding portions 28a and 28b is provided inside the housing portion 29 of the holding member 20 corresponding to the light-emitting portion 12 of the optical member 10 and/or the elastic position adjustment member 30.

The elastic position adjustment member 30 is a metal spring corresponding to the contour of the optical member 10. The elastic position adjustment member 30 includes: at least a base plate 34; one side plate 31 bent at substantially right angles to the base plate 34; the other side plate 32 bent at substantially right angles to the base plate 34 and formed substantially in a manner parallel to the one side plate 31; and another side plate 33 bent at substantially right angles to the base plate 34 and formed substantially in a manner parallel to the one side plate 31 and/or the other side plate 32, and is formed as the metal spring (position adjustment member) 30 corresponding to the contour of the optical member 10.

The base plate 34 of the elastic position adjustment member 30 is formed substantially in a curved shape and includes: an abutting plate 34c which comes in contact with an inner wall 29c of the housing portion 29 of the holding member 20; a pair of left and right tilted plates 34a and 34b that are one tilted plate 34a and the other tilted plate 34b each formed substantially in a manner parallel to and gently tilted relative to the abutting plate 34c; and an extended plate 34d that is extended from the one tilted plate 34a and is formed substantially in a manner parallel to and is gently tilted relative to the one tilted plate 34a and is formed in a manner parallel to the abutting plate 34c.

The elastic position adjustment member 30 is mounted on the optical member 10 with at least three points. The elastic position adjustment member 30 is mounted on the optical member 10 with a least three points of the one side plate 31, the other side plate 32, the another side plate 33 and/or the base plate 34.

The elastic position adjustment member 30 includes a thrusting portion 35 for thrusting the optical member 10 along one direction 25a to bring the optical member 10 toward the one direction 25a. The elastic position adjustment member 30 includes a thrusting portion (side plate) 32 and/or a thrusting portion 33 for thrusting the optical member 10 along another direction 25b that is a direction substantially orthogonal to the one direction 25a. When the optical member 10 is thrust along the another direction 25b by the thrusting portions 32/33 of the elastic position adjustment member 30, the substantially inwardly curved base plate 34 of the elastic position adjustment member 30, which comes in contact with the interior of the housing portion 29 of the holding member 20 serves as a substantially inwardly curved plate-like elastic portion 34 that generates a force of repulsion against the optical member 10, for example.

By the action of a restoring elastic force occurring at the substantially inwardly curved base plate 34 of the elastic position adjustment member 30, the thrusting portions 32/33 of the elastic position adjustment member 30 thrust end portions 12a/12b of the light-emitting portion 12 of the optical member 10 toward the guiding portions 28a/28b of the housing portion 29 of the holding member 20.

The thrusting portion 35 of the elastic position adjustment member 30 is formed to project, by bending process, in a substantially dog-leg shape along the one direction 25a. The substantially dog-leg shaped thrusting portion 35 of the elastic position adjustment member 30 is formed by bending process, etc., so as to include: one tilted surface portion 35a, which is formed by being tilted toward the inside of the elastic position adjustment member 30; the other tilted surface portion 35b, which is contiguous to the one tilted surface portion 35a and is formed by being tilted toward the inside of the elastic position adjustment member 30; and a top portion 35c, which comes in contact with the optical member 10 and is provided as a portion at which the one tilted surface portion 35a and the other tilted surface portion 35b are met. The optical member 10 is supported with at least one point in such a manner as to be thrust toward a lateral direction (one direction) 25a of the optical member 10 by the thrusting portion 35 of the elastic position adjustment member 30.

The elastic position adjustment member 30 includes a mounting facilitating portion 37, which facilitates the mounting of the elastic position adjustment portion 30 onto the holding member 20 by mounting the elastic position adjustment portion 30 in the housing portion 29 of the holding member 20 while being thrust thereto, when at least the elastic position adjustment portion 30 is mounted onto the holding member 20 by being mounted in the housing portion 29 of the holding member 20. The mounting facilitating portion 37 of the elastic position adjustment member 30 is formed to also serve as a stopper for positioning, at high accuracy, the elastic position adjustment member 30 in the housing portion 29 of the holding member 20.

The elastic position adjustment member 30 includes a guiding portion 37, which facilitates the accurate mounting of the elastic position adjustment portion 30 onto the holding member 20 by mounting the elastic position adjustment portion 30 in the housing portion 29 of the holding member 20, when at least the elastic position adjustment portion 30 is mounted onto the holding member 20 by being mounted in the housing portion 29 of the holding member 20. A guiding portion 29a is provided in the housing portion 29 of the holding member 20 corresponding to a guiding portion 39 of the elastic position adjustment member 30.

Making up the mounting structure for the optical member 10 enables the optical member 10 to be mounted onto the holding member 20 with the optical member 10 being reliably positioned by the elastic position adjustment member 30. When the optical member 10 and the elastic position adjustment member 30 are mounted onto the housing portion 29 of the holding member 20, a restoring elastic force occurring at the elastic position adjustment member 30 allows the light-emitting portion 12 of the optical member 10 to be thrust along the one direction 25a, which is an upper-left direction in front view as depicted in FIG. 3 so as to reliably abut the guiding portion 28b in the housing portion 29 of the holding member 20, as well as allows the light-emitting portion 12 of the optical member 10 to be thrust along the another direction 25b, which is a lower-left direction in front view, so as to reliably abut the guiding portions 28a and 28b in the housing portion 29 of the holding member 20. The optical member 10 is thus mounted onto the holding member 20 in such a manner as to be reliably positioned.

Specific description will then be given of the mounting structure for the semiconductor laser, i.e., the mounting structure for a so-called LD 10 depicted in FIGS. 1 to 3. The mounting structure for the LD 10 includes: a substantially plate-shaped frame type LD 10, which is capable of emitting laser light; a metal and/or resin laser holder 20, which is capable of accommodating the LD 10 and a leaf spring 30 and is provided with the LD 10 and the leaf spring (position adjustment member) 30; and the metal leaf spring 30, which intervenes between the LD 10 and the laser holder 20 and is capable of automatically adjusting the position at which the LD 10 is mounted onto the laser holder 20 corresponding to the contour of the LD 10.

The LD 10 is configured as a substantially plate-shaped frame type LD 10 capable of emitting laser light, and includes a substantially plate-shaped light-emitting portion 12 that emits laser light, a substantially laid-down U-shaped plate-like body portion 14 that supports the substantially plate-shaped light-emitting portion 12, and three substantially rectangular rod-shaped terminal portions 16 that protrudes from the substantially laid-down U-shaped plate-like body portion 14.

The laser holder 20 includes a holder body portion 21 including a housing room (housing portion) 29 into which the LD 10 and the leaf spring 30 are inserted, and a heat-dissipation facilitating portion (heat-dissipating portion) 22 including two heat-dissipating fins 22a for efficiently dissipating heat generated from the LD 10. The substantially rectangular box-shaped holder body portion 21 of the holding member 20 includes an opening 26 tilted relative to the reference surface portion 20a of the holding member 20, for example. The substantially rectangular box-shaped holder body portion 21 of the holding member 20 includes the housing room 29 tilted relative to the reference surface portion 20a of the holding member 20, for example.

The laser holder 20 is formed using a nonferrous metal containing at least one element selected from a group of aluminum (Al), magnesium (Mg), and zinc (Zn), a metal such as a die cast alloy, etc., for example. Aluminum, magnesium, and zinc are excellent in corrosion resistance and are nonferrous metal having a specific gravity smaller than iron. The laser holder 20 is formed using a nonferrous metal material such as an aluminum alloy containing aluminum as a main component thereof, for example. In order to effectively conduct/dissipate heat generated from the LD 10, for example, the laser holder 20 is preferably formed using the above described metal material excellent in heat dissipation properties.

Alternatively, the laser holder (20) is formed using a highly moldable heat-resistant thermoplastic synthetic resin composition having an aromatic ring, which contains a base material of thermoplastic PI, LCP, PAS such as PPS, or a ketone resin of polyether ether ketone (PEEK (registered trademark)), polyaryl ether ketone (PAEK), etc., which is excellent in mechanical properties, slide properties, dimensional stability, heat resistance, injection moldability, electrical properties including insulation properties, etc., and which is capable of more weight reduction than an iron material, etc., for example. The resin material is smaller in specific gravity than iron, and suitable for weight reduction. The laser holder (20) is formed using at least one of resin compositions containing a thermoplastic heat-resistant resin having an aromatic ring selected from a group of PI, LCP, PPS, PAS, PEEK, and PAEK, for example.

The leaf spring 30 is formed using a metal material, for example. For instance, in order to form large quantities of the leaf springs 30 at high efficiency and at a low cost, a thin-walled steel plate such as a rolled steel plate (both not shown) is subjected to press metal molding process such as punching process, bending process, and pressing process, so as to form the leaf spring 30. Specifically, a metal material plate containing iron as a main component thereof such as a rolled steel plate, for example, is used to be punched/bent by a pressing forming machine, etc. (all not shown), so that the leaf spring 30 is formed. The metal material plate containing iron as a main component thereof includes a stainless steel plate, the rolled steel plate, a band steel, etc., for example. A cold rolled steel plate and/or the band steel include SPCC, SPCD, SPCE, etc., specified based on "JIS G 3141", for example. In order to effectively conduct/dissipate heat generated from the LD 10, for example, the leaf spring 30 is preferably formed using above described metal material excellent in heat dissipation properties.

The leaf spring (30) is formed using a synthetic polymer such as a resin material, for example. For instance, in order to form large quantities of the leaf springs (30) at high efficiency and at a low cost, the leaf springs (30) is formed using is a heat-resistant synthetic resin with an aromatic ring which has a thermoplastic properties and is capable of injection molding. The heat-resistant synthetic resin with an aromatic ring which has a thermoplastic nature and is capable of injection molding is thermoplastic PI, LCP, PAS such as PPS, PAEK such as PEEK, for example. The leaf spring (30) is formed using at least one resin composition containing a thermoplastic heat-resistant resin having an aromatic ring among the resin compositions containing thermoplastic heat-resistant resins having aromatic rings selected from a group of PI, LCP, PPS, PAS, PEEK, and PAEK, for example.

The opening 26 of the laser holder 20 includes a chamfered portion (mounting facilitating portion) 27 for facilitating the insertion of the LD 10 and/or the leaf spring 30.

A pair of guide grooves (guiding portions) 28a and 28b for facilitating the insertion of at least the LD 10 is provided inside the housing room 29 of the laser holder 20. For example, the pair of guide grooves 28a and 28b is provided inside the housing room 29 of the laser holder 20 corresponding to the light-emitting portion 12 of the LD 10 and the leaf spring 30.

The leaf spring 30 is formed as a metal leaf spring 30 corresponding to the contour of the LD 10, and includes: a substantially flat-plate-shaped base plate 34, which substantially gently curved to be formed in a tilted manner; a substantially chevron-shaped first side plate 31, which is bent at substantially right angles to the substantially flat-plate-shaped base plate 34; a substantially flat-plate-shaped second side plate 32, which is bent at substantially right angles to the substantially flat-plate-shaped base plate 34 and is formed substantially in a manner parallel to the substantially chevron-shaped first side plate 31; a substantially flat-plate-shaped third side plate 33, which is bent at substantially right angles to the substantially flat-plate-shaped base plate 34 and is formed substantially in a manner parallel to the substantially chevron-shaped first side plate 31 and/or the substantially flat-plate-shaped second side plate 32; a substantially flat-plate-shaped fourth side plate (mounting facilitating portion) 37, which is bent at substantially right angles to the substantially flat-plate-shaped base plate 34 and is formed at substantially right angles to the substantially chevron-shaped first side plate 31 and/or the substantially flat-plate-shaped second side plate 32 and/or the substantially flat-plate-shaped third side plate 33; and a substantially flat-plate-shaped fifth side plate (guiding portion) 39, which is tilted relative to the substantially flat-plate-shaped base plate 34, is bent, and protrudes therefrom.

The base plate 34 of the metal leaf spring 30 is formed in a shape of substantially curved plate which is substantially gently curved, for example, and includes: an abutting plate portion 34c, which comes substantially in surface-contact with an upper inner wall portion 29c of the housing room 29 of the laser holder 20; tilted plate portions 34a and 34b provided on the left and right, i.e., a first tilted plate portion 34a and a second tilted plate portion 34b, which are gently tilted relative to the abutting portion 34c while being provided in a manner substantially parallel thereto; and an extended plate portion 34d, which is a portion extending from the first tilted plate portion 34a, gently tilted relative to the first tilted plate portion 34a while being provided in a manner substantially parallel thereto, and provided in a manner substantially parallel to the abutting plate portion 34c.

The leaf spring 30 is mounted on the LD 10 with at least three points, preferably four points. The leaf spring 30 is mounted on the LD 10 with at least three points, preferably four points of the first side plate 31, the second side plate 32, the third side plate 33 and/or the base plate 34.

The leaf spring 30 includes an elastically thrusting portion 35 that brings the LD 10 toward a first direction (one direction) 25a and thrusting the LD 10 along the first direction 25a. The leaf spring 30 includes a pair of elastically thrusting portions 32 and 33 that thrusts the LD 10 along a second direction (another direction) 25b that is a direction substantially orthogonal to the first direction 25a. When the light-emitting portion 12 of the optical member 10 is thrust along the second direction 25b by the pair of thrusting portions 32 and 33 of the leaf spring 30, the gently substantially inwardly curved base plate 34 of the leaf spring 30, which comes in contact with the inner wall portion 29c of the housing portion 29 of the laser holder 20 serves as a gently substantially inwardly curved plate-like elastic portion 34 that generates a force of repulsion against the light-emitting portion 12 of the LD 10, for example. By the action of a restoring elastic force occurring at the substantially inwardly curved base plate 34 of the leaf spring 30, the pair of thrusting portions 32 and 33 of the leaf spring 30 thrusts both end portions 12a and 12b of the light-emitting portion 12 of the LD 10 toward the guide grooves 28a and 28b of the housing room 29 of the holding member 20.

The elastically thrusting portion 35 of the leaf spring 30 is formed to project, by bending process, in a substantially dog-leg shape along the first direction 25a. The substantially dog-leg shaped thrusting portion 35 of the leaf spring 30 is formed by bending process, etc., so as to include: a first tilted surface portion 35a, which is tilted toward the inside of the leaf spring 30, a second tilted surface portion 35b, which is contiguous to the first tilted surface portion 35a and is tilted toward the inside of the leaf spring 30, and a top portion 35c, which cones in contact with the light-emitting portion 12 of the LD 10 and is provided as a portion at which the first tilted surface portion 35a and the second tilted surface portion 35b are met. The LD 10 is supported with at least one point in such a manner as to be thrust toward a frame lateral direction 25a of the LD 10 by the elastically thrusting portion 35 of the leaf spring 30. The elastically thrusting portion 35 of the leaf spring 30 may be formed as a laterally shortened substantially dog-leg shape or a laterally elongated substantially dog-leg shape for example.

The leaf spring 30 includes an thrust mounting facilitating portion 37, which facilitates the mounting of the leaf spring 30 onto the laser holder 20 by mounting the leaf spring 30 in the housing room 29 of the laser holder 20 while being thrust thereto, when at least the leaf spring 30 is mounted onto the laser holder 20 by being mounted in the housing room 29 of the laser holder 20. The thrust mounting facilitating portion 37 of the leaf spring 30 abuts an open recessed portion 26a provided in an opening 26 of the laser holder 20. The thrust mounting facilitating portion 37 of the leaf spring 30 is formed to also serve also as a thrusting stopper for positioning, at high accuracy, the leaf spring 30 in the housing room 29 of the laser holder 20.

The leaf spring 30 includes a tilted-plate like thrusting guide plate (guiding portion) 39 which facilitates the accurate mounting of the leaf spring 30 in the housing room 29 of the laser holder 20 when at least the leaf spring 30 is mounted onto the laser holder 20 by being mounted in the receiving room 29 of the laser holder 20. A guide groove (guiding portion) 29a is provided in the housing room 29 of the laser holder 20, corresponding to the tilted-plate-like thrusting guide plate guiding portion 39 of the leaf spring 30. When the LD 10 and the leaf spring 30 are completely inserted into the housing room 29 of the laser holder 20, a tilted-plate like pressing stopper 39 of the leaf spring 30 adjoins a tilted deep end portion 29b in the housing room 29 of the lens holder 20.

After the frame LD 10 and the leaf spring 30 have completely been inserted into the housing room 29 of the laser holder 20, a thermosetting/thermoplastic adhesive is automatically applied, so as to fix the frame LD 10, the laser holder 20, and the leaf spring 30 without being separated. The thermosetting/thermoplastic adhesive is used, and when annealing a composition containing, as a base material thereof, a PAS resin such as PPS with which the laser holder 20, etc., are formed, for example, a reduction in viscosity of the adhesive is utilized, for example, so as to apply the adhesive to the adhesion surface portions of the LD 10 substantially in a uniform manner.

The adhesive includes a one-component adhesive, a two-component adhesive, etc., for example. As a polymer/main component making up the one-component and/or two-component adhesive, for example, at least one of polymers selected from a group of an epoxy polymer, a modified acrylic polymer, a polyurethane polymer, an acrylic ester polymer, and a methacrylic ester polymer is used. A resin making up the one-component and/or two-component adhesive after curing is at least one of resins selected from a group of an epoxy resin, a modified acrylic resin, a polyurethane resin, a polyacrylic resin, and a polymethacrylic resin, for example. As a curing agent making up the two-component adhesive, for example, at least one of polymers selected from a group of polythiol, polyamide-amine, modified polyamine, and tertiary amine is used.

For instance, one bonded by a bonding process using a two-component ultraviolet-curing adhesive may be applicable the bonding process. The two-component ultraviolet-curing adhesive includes a two-component epoxy ultraviolet-curing adhesive, for example. Use of the polymer adhesive such as the acrylic adhesive or the epoxy adhesive enables absorption of high-vibrational components, etc., for example.

A specific epoxy adhesive includes Araldite (registered trademark) 2010-1, 2012, etc., manufactured by Huntsman (Huntsman Advanced Materials) Co., Ltd., Switzerland and sold by Huntsman Japan, K.K., for example. Araldite (registered trademark) 2010-1 is of a viscosity of substantially 80000 mPas (millipascal-second) on condition of a temperature of 23° C. and is excellent in fast curability. Araldite (registered trademark) 2012 is a two-component adhesive having a main agent AW2104 and a curing agent HW2934 and is of a viscosity of substantially 25000 mPas to 35000 mPas on condition of a temperature of 23° C. and excellent in versatility and fast curability.

A specific polyurethane adhesive includes Araldite (registered trademark) 2055, etc., manufactured by Huntsman (Huntsman Advanced Materials) Co., Ltd., Switzerland and sold by Huntsman Japan, K.K., for example. Araldite (registered trademark) 2055 has thixotropic properties, for example, and is of a tensile shear strength of substantially 9000 mPas, for example, and excellent in gap filling properties, for example. The thixotropic properties mean phenomenon that the apparent viscosity lowers when stirring in a solid-liquid coexisting state where a solution partly solidifies in the transition from a liquefied state to a solidified state.

A specific modified acrylic adhesive includes Araldite (registered trademark) 2021, etc., manufactured by Huntsman (Huntsman Advanced Materials) Co., Ltd., Switzerland and sold by Huntsman Japan, K.K., for example. Araldite (registered trademark) 2021, for example, is a two-component adhesive having a main agent XD4661A and a curing agent XD4661D and, is of a viscosity of substantially 60000 mPas on condition of a temperature of 23° C., requires a minimum curing time of substantially 18 minutes, that is, Araldite 2021 is more superior in quick cuing property to other Araldit (registered trademark) products.

The adhesive includes an anaerobic adhesive, such as a high-strength anaerobic sealant manufactured by ThreeBond Co., Ltd., for example. The anaerobic adhesive is an adhesive that does not cure while it is exposed to air but cures when it is cut off from air. Since the high-strength anaerobic sealant manufactured by ThreeBond Co., Ltd., has also an electron beam curing property, such as the ultraviolet curing property, in combination with the above property, and thus, a forced-out portion of the anaerobic adhesive cures when exposed to such electron beams as ultraviolet light. The main component making up the anaerobic adhesive include (meth)acrylic ester, methacrylic ester, methacrylic ester monomer, etc., for example.

ThreeBond manufactured 1300 series adhesives classified as anaerobic adhesives include ThreeBond (registered trademark) 1359D, ThreeBond (registered trademark) 1373N, etc., for example. ThreeBond (registered trademark) 1359D contains (meta)acrylic ester as a main component thereof before curing, and is of a viscosity of substantially 14000 mPas at room temperature with fast curability, for example, and is of the electron beam curing property such as the ultraviolet-curing property. After curing, it turns into a polyacrylic resin to exhibit excellent anti-vibration property, heat resistance, flexibility, surface adhesive property, etc. ThreeBond (registered trademark) 1373N contains a methacrylate ester as a main component thereof before curing, and is of a viscosity of substantially 90 mPas at room temperature with fast curability, for example, and is of the electron beam curing property such as the ultraviolet-curing property. After curing, it turns into a methacrylate resin to exhibit excellent anti-vibration property, heat resistance, a low-temperature curing property, etc.

The adhesive includes an instant adhesive (Gold Label Series) manufactured by ThreeBond Co., Ltd., for example. An instant adhesive is an adhesive that bonds materials to be fixed together at "a speed per second", i.e., within several seconds to several tens of seconds. ThreeBond manufactured 7700 series adhesives classified as the instant adhesive include ThreeBond (registered trademark) 7741, etc., for example. ThreeBond (registered trademark) 7741 contains 2-cyanoacrylic acid ethyl as a main component thereof, and is of a viscosity of substantially 2 mPas at room temperature, for example, with an excellent instant adhesive property.

The ultraviolet-curing adhesive, which is one type of the electron beam curing adhesives, includes optical UV adhesives NOA65, NOA68, NOA73, NOA83H, etc., manufactured by Norland Products Inc., USA, for example. The ultraviolet-curing adhesive such as the optical UV adhesives NOA65, NOA68, NOA73, and NOA83H is acrylic and a one-component ultraviolet-curing adhesive. The acrylic ultraviolet-curing adhesive cures in less time, and is capable of curing within several seconds. "UV" represents "ultraviolet". The ultraviolet-curing adhesive is called a UV curing adhesive, etc.

NOA65 manufactured by Norland Products Inc., has a viscosity of substantially 1000 cps (centipoise) to 1200 cps at room temperature, for example, and has flexibility to allow application thereof to a complicated or delicate part, for example. It should be noted that 1 cps is equivalent to 1 mPas. NOA68 manufactured by Norland Products Inc., has a viscosity of substantially 5000 cps at room temperature for example and has flexibility to allow application thereof to a complicated or delicate part, for example. NOA73 manufactured by Norland Products Inc., has a viscosity of substantially 130 cps at room temperature, for example and has flexibility and a low viscosity to allow thin application thereof to a complicated or delicate part, for example. NOA83H manufactured by Products Inc., has a viscosity of substantially 250 cps at room temperature, for example, and has a thermosetting property in addition to the UV property, to allow application thereof to apart not directly exposed to light, for example.

The ultraviolet-curing adhesive, which is one type of the electron beam curing adhesives, includes product name "OPTOCAST" series adhesives manufactured by U.S. EMI, for example. Specific ultraviolet-curing adhesives include OPTOCAST 3415, OPTOCAST3505-HM, etc., manufactured by U.S. EMI. The ultraviolet-curing adhesive such as OPTOCAST3415, OPTOCAST3505-HM, etc., is epoxy and is a one-component ultraviolet-curing adhesive. The epoxy ultraviolet-curing adhesive has low contractility and high heat resistance, and is excellent in chemical resistance and moisture resistance. By using one-component ultraviolet-curing adhesive, a liquid mixing work becomes unnecessary, which is required when using the two-component ultraviolet-curing adhesive. Thus, a process of applying the adhesive can be performed more swiftly and efficiently.

OPTOCAST3415 manufactured by U.S. EMI is of a viscosity of substantially 100000 cps at room temperature, for example, and is reliably cured by heat application in addition to UV irradiation. OPTOCAST3505-HM manufactured by U.S.EMI is of a viscosity of substantially 300 cps to 500 cps at room temperature, for example and is securely set by heat application in addition to UV irradiation.

When the bonding process is performed, the adhesive is set to a viscosity of greater than or equal to substantially 2 mPas and to smaller than or equal to substantially 180000 mPas on condition of room temperature, specifically at a temperature of 23° C., for example.

In the case where the adhesive has a high viscosity exceeding substantially 180000 mPas on condition of room temperature, specifically at a temperature of 23° C., the adhesive may not spread substantially uniformly in the interior of the housing room 29 of the laser holder 20 provided with the frame LD 10 and the leaf spring 30.

Thus, upon the bonding process, the adhesive is preferably set to a viscosity of smaller than or equal to substantially 60000 mPas on condition of room temperature, specifically at a temperature of 23° C., for example. More preferably, upon bonding process, the adhesive is set to a viscosity of smaller than or equal to substantially 14000 mPas on condition of room temperature, specifically at a temperature of 23° C., for example, so that the adhesive can reliably spread in the interior of the housing room 29 of the laser holder 20 provided with the frame LD 10 and the leaf spring 30.

In the case where the adhesive has a low viscosity smaller than substantially 2 mPas on condition of room temperature, specifically at a temperature of 23° C., the adhesive may drip from the interior of the housing room 29 of the laser holder 20 provided with the frame LD 10 and the leaf spring 30.

Upon the bonding process, the adhesive is preferably set to a viscosity of greater than or equal to substantially 250 mPas, for example, on condition of room temperature, specifically at a temperature of 23° C., so that dripping of the adhesive is hard to occur, and thus, the adhesive can widely and reliably remain within the interior of the housing room 29 of the laser holder 20 provided with the frame LD 10 and the leaf spring 30.

More preferably, upon the bonding process, the adhesive is set to a viscosity of greater than or equal to substantially 1000 mPas on condition of room temperature, specifically at a temperature of 23° C., for example, so that the occurrence of dripping of the adhesive becomes easily prevented, for example, and thus, the adhesive can reliably remain within the interior of the housing room 29 of the laser holder 20 provided with the frame LD 10 and the leaf spring 30.

After the frame LD 10 and the leaf spring 30 have completely inserted into the housing room 29 of the laser holder 20 and the thermosetting/thermoplastic adhesive has been applied and fixed, the light-emitting portion 12 of the frame LD 10, etc., is applied with a grease-like heat-dissipating agent, to be mounted. Alternatively, the frame LD 10 and the leaf spring 30 have completely inserted into the housing room 29 of the laser holder 20, and the thermosetting/thermoplastic adhesive, acting also as the heat-dissipating agent, is applied and fixed. From the viewpoint of a mounting property, etc., of the heat-dissipating agent, a grease-like or adhesive-like heat-dissipating agent is preferably used, for example. Alternatively, the frame LD 10, the leaf spring 30, and a substantially plate-shaped heat-dissipating agent (not shown) intervening between the frame LD 10 and the leaf spring 30 have completely inserted in the housing room 29 of the laser holder 20, and the thermosetting/thermoplastic adhesive is applied and fixed.

The heat-dissipating agent includes a high-performance heat-conductive sheet (thickness: 0.2 mm or 0.5 mm) manufactured by Shinwa Sangyo, for example. The high-performance heat-conductive sheet is provided for heat conduction between a heat-generating element such as the LD 10 and a heat-dissipating member such as the laser holder 20, for example. The high-performance heat-conductive sheet (thickness: 0.2 mm or 0.5 mm) has a thermal conductivity of substantially 50 W/(mK) (watt per meter per kelvin).

The heat-dissipating agent includes German Grease (made in Germany) supplied by Shinwa Sangyo, for example. German Grease is silver-containing grease having an excellent heat-dissipation property and is easily applied to a target object. German Grease has fine particles so as to ensure a smooth penetration into gaps in microns, for example, thereby conducting heat efficiently. German grease is of a thermal conductivity of substantially 10 W/(mK).

The heat-dissipating agent includes non-silicone highly heat-conductive grease manufactured by Nihon Data Material Co., Ltd., for example. Specifically, the heat-dissipating agent includes non-silicone highly heat-conductive grease TG200 series, etc., manufactured by Nihon Data Material Co. Ltd., for example. To describe the non-silicone highly heat-conductive grease, it is of an excellent heat-dissipation property and is easy to spread with good application workability so as to capable of thin-film application, wherein less pump-out attributable to the high-heatproof thermal cycle is caused, and an insulation film arising from non-silicone low molecular siloxane is not generated. A specific heat-dissipating agent includes non-silicone highly heat-conductive grease TG200 series having a thermal conductivity of 2, 4, and 6 W/(mK), etc., manufactured by Nihon Data Material Co. Ltd., For example, in the non-silicone highly heat-conductive grease TG200 series, grease having a thermal conductivity of 2 W/(mK) based on the steady method is of a viscosity of substantially 50 Pas (Pascal second) based on an E-type viscometer (3 rpm), for example, and is capable of thin film application. In the non-silicone highly heat-conductive grease TG200 series, grease having a thermal conductivity of 4 W/(mK) based on the steady method is of a viscosity of substantially 180 Pas based on the E-type viscometer (3 rpm), for example, and is excellent in application property. In the non-silicone highly heat-conductive grease TG200 series, grease having a thermal conductivity of 6 W/(mK) based on the steady method is of a viscosity of substantially 280 Pas based on the E-type viscometer (3 rpm), for example, and is of high heat conductivity.

The heat-dissipating agent includes ones of SilCool (trademark) series manufactured by Momentive Performance Materials Inc., Japan, for example. Specifically, the heat-dissipating agent includes a surface-hardening heat-dissipating polymer such as surface-hardening heat-dissipating silicone manufactured by Momentive Performance Materials Inc., Japan, for example. To describe surface-hardening silicone, the surface-hardening silicone has such a property that the inside thereof becomes mastic while the surface thereof becomes hardened like rubber. The surface-hardening silicone is excellent in application workability, etc., and exhibits heat conduction properties substantially equivalent to those of grease. In the surface-hardening silicon, less oil bleeding occurs due to its hardening properties and repairing workability is excellent, for example. The surface-hardening silicone is of a low viscosity in spite of its thixotropic properties, and thus, is capable of easy syringe application, for example. A specific heat-dissipating agent includes surface-hardening heat-dissipating silicone TIS361C, etc., manufactured by Momentive Performance Materials Inc., Japan. For example, the surface-hardening heat-dissipating silicone TIS361C is of a one-component condensed type, has a thermal conductivity of substantially 3.6 W/(mK) based on the hot-wire method, has a viscosity of substantially 120 Pas on condition of a temperature of 23° C., and requires a surface hardening time thereof as short as substantially 30 min., i.e., fast curability thereof is superior to other surface-hardening heat-dissipating silicone.

For example, an adhesive which serves also as a heat-dissipating agent is also available. The adhesive serving also as a heat-dissipating agent includes ones of SilCool (trademark) series manufactured by Momentive Performance Materials Inc., Japan, for example. Specifically, the adhesive serving also as a heat-dissipating agent includes a silicone adhesive (condensed type), etc., manufactured by Momentive Performance Materials Inc., Japan. The condensed type silicone adhesive includes a condensed type adhesive or sealant having heat conduction properties. The condensed type silicone adhesive is a one-component room-temperature curing adhesive excellent in heat-dissipation properties and reacts with moistures in the air to become hardened like rubber. Accordingly, it is provided as a heat-dissipating adhesive that is fixable without any heating device. A specific adhesive serving also as a heat-dissipating agent includes condensed type silicone adhesive XE11-C2148, etc., manufactured by Momentive Performance Materials Inc., Japan. The condensed type silicone adhesive XE11-C2148 is of one-component room-temperature curing type, has a thermal conductivity of substantially 2.2 W/(mK), has a viscosity of substantially 320 Pas on condition of a temperature of 23° C., for example. Use of the one-component room-temperature curing type adhesive, acting also as a heat-dissipating agent, contributes to improvement in the application workability and productivity.

The heat-dissipating agent includes highly heat-conductive grease "NANOTIM (trademark)", etc., manufactured by TTM Co., Ltd., in Korea, for example. Specifically, the heat-dissipating agent includes highly heat-conductive grease "Type: NANOTIM TGS", etc., manufactured by TTM Co., Ltd., in Korea, for example. The highly heat-conductive grease "Type: NANOTIM TGS" is an inexpensive heat-conductive grease conforming to RoHS/Rohs (restriction of the use of certain hazardous substances in electrical and electronic equipment). The highly heat-conductive grease "NANOTIM TGS-E100" manufactured by TTM Co., Ltd., in Korea, for example, is of a thermal conductivity of substantially 0.5 W/(mK).

It is preferable that the heat-dissipating agent which has a thermal conductivity greater than or equal to at least substantially 0.5 W/(mK) is used as the heat-dissipating agent, for example. In the case where one having the thermal conductivity smaller than substantially 0.5 W/(mK), it is concerned that the heat dissipation of the LD 10, etc., may become hard, for example.

It is more preferable that the heat-dissipating agent, which has a thermal conductivity greater than or equal to substantially 2 W/(mK), is used as the heat-dissipating agent, for example. Use of the heat-dissipating agent having a thermal conductivity greater than or equal to substantially 2 W/(mK), for example, contributes to favorable heat dissipation of the LD 10, etc., for example. Thus, it becomes easy to prevent the performance of the LD 10 from being unstable as a result of heat generated by the LD 10 being accumulated within the LD 10.

The heat-dissipating agent having high heat dissipation properties includes a heat-dissipating agent having a thermal conductivity of the order of substantially 50 W/(mK) or a thermal conductivity of the order of substantially 126 W/(mK), for example. The heat-dissipating agent is of a thermal conductivity smaller than or equal to the order of substantially 126 W/(mK), specifically, smaller than or equal to the order of substantially 50 W/(mK), for example. Preferably, as the heat-dissipating agent having a high heat-dissipation property, a grease-like heat-dissipating agent is used, which is excellent in application properties and is of a heat-conduction property of the order of substantially 10 W/(mK), for example. The grease-like heat dissipating agent is of a thermal conductivity smaller than or equal to the order of substantially 10 W/(mK) or below, for example.

When the heat-dissipating agent application process is carried out, the viscosity of the heat-dissipating agent is preferably greater than or equal to at least substantially 250 mPas on condition of room temperature, for example.

In the case where the heat-dissipating agent has a low viscosity smaller than substantially 250 mPas on condition of room temperature, it is concerned that dripping, etc., may occur of the heat-dissipating agent from the interior of the housing room 29 of the laser holder 20 provided with the frame LD 10 and the leaf spring 30.

Preferably, when the heat-dissipating agent application process is performed, the heat-dissipating agent is employed which has a viscosity greater than or equal to substantially 1000 mPas, for example, on condition of room temperature, so that dripping of the heat-dissipating agent is hard to occur, for example, and thus the heat-dissipating agent can securely remain within the interior of the housing room 29 of the laser holder 20 provided with the frame LD 10 and the leaf spring 30.

More preferably, when the heat-dissipating agent application process is performed, the heat-dissipating agent is employed which has a viscosity greater than or equal to substantially 500000 mPas, for example, on condition of room temperature, occurrence of dripping of the heat-dissipating agent is easily prevented so that the heat-dissipating agent can reliably remain within the interior of the housing room 29 of the laser holder 20 provided with the frame LD 10 and the leaf spring 30.

The high viscosity heat-dissipating agent includes a heat-dissipating agent having a high viscosity of the order of substantially 280000 mPas or of the order of substantially 320000 mPas on condition of room temperature, for example. The heat-dissipating agent is of a viscosity smaller than of equal to the order of substantially 320000 mPas, specifically, smaller than or equal to the order of substantially 280000 mPas.

If the mounting structure for the frame semiconductor laser, i.e., the mounting structure for the so-called frame LD 10 depicted in FIGS. 1 to 4 is configured and the various types of adhesives such as the adhesives serving also as the heat-dissipating agent are used, for example, the frame LD 10 is mounted on the laser holder 20 with the frame LD 10 being reliably positioned by the leaf spring 30. When the frame LD 10 and the elastic position adjustment member 30 are mounted in the housing room 29 of the laser holder 20, a restoring elastic force occurring at the elastic position adjustment member 30 allows the substantially rectangular plate-shaped light emitting portion 12 of the frame LD 10 to be thrust along the first direction 25*a*, which is an upper left direction in front view as depicted in FIG. 3, to reliably abut against the one guide groove 28*b* in the housing room 29 of the laser holder 20, as well as allows the substantially rectangular plate-shaped light emitting portion 12 of the frame LD 10 to be thrust along the second direction 25*b*, which is a lower-left direction in front view, to reliably abut against the pair of guide grooves 28*a* and 28*b* in the housing room 29 of the laser holder 20. Thus, the frame LD 10 is mounted on the laser holder 20 while being reliably positioned. Use of the various types of adhesives such as the adhesives serving also as the heat-dissipating agent, for example, allows the frame LD 10 mounted on the laser holder 20 in a reliably positioned manner to be securely fixed to the laser holder 20.

In the method of mounting the optical member 10 or the LD 10, which had previously been employed, such a bringing-to-one-side operation has basically been performed by hand that, after insertion of the frame LD 10 into the housing room 29 of the laser holder 20, the frame LD 10 is thrust along the first direction 25*a*, which an upper-left direction in front view, to be positioned and fixed. In the present method of mounting the optical member 10 or the LD 10, however, the leaf spring 30 is inserted into the housing room 29 of the laser holder 20 after the frame LD 10 is inserted into the housing room 29 of the laser holder 20, so that a restoring elastic force occurs in the leaf spring 30 elastically, which is deformed so as to bring the frame LD 10 to one side and be positioned to be fixed, and thus, the frame LD 10 is brought to one side by the restoring elastic force generated in the leaf spring 30. Alternatively, in the present method of mounting the optical member 10 or the LD 10, the leaf spring 30 and the frame LD 10 are mounted together onto the housing room 29 of the laser holder 20 while the leaf spring 30 and the frame LD 10 being joined together, so that a restoring elastic force occurs in the leaf spring 30, which is elastically deformed so as to bring the frame LD 10 to one side and be positioned to be fixed so that the frame LD 10 is brought to one side by the restoring elastic force generated in the leaf spring 30. As such, with the use of the leaf spring 30, the bringing-to-one-side operation for positioning and fixing the frame LD 10 is performed easily, automatically, and efficiently. A position at which the frame LD 10 is brought is determined concurrently with the leaf spring 30 for positioning and fixing the frame LD 10 being inserted into the housing room 29 of the laser holder 20.

By executing the method of mounting the optical member 10 or the LD 10 and by making up the mounting structure for the optical member 10 or the mounting structure for the LD 10, the workability is improved of the bringing-to-one-side operation of the frame LD 10 against the laser holder 20 when the frame LD 10 is mounted onto the laser holder 20. For instance, possible human errors are eliminated since the bringing-to-one-side operation is not performed by hand. The number of frame LDs 10 to be discarded as a result of erroneous bonding and fixing by human errors is reduced, to avoid waste. Thus, the yield rate is improved of the OPU 1 with the mounting structure for the optical member 10 or the mounting structure for the LD 10.

Stabilization is also achieved of the optical axis, luminance distribution performance, etc., which act on the performances of the OPU 1. Further, any possible damage is also prevented of a light-emitting point 12*c* of the light-emitting portion 12 when the frame LD 10 is mounted into the laser holder 20. The frame LD 10 and the leaf spring 30 have completely inserted into the housing room 29 of the laser holder 20 and the thermosetting/thermoplastic adhesive is applied and fixed, and thereafter, the heat-dissipating agent is applied to the light-emitting portion 12, etc., of the frame LD 10. Thus, workability of heat-dissipating agent application to the frame LD 10 is also improved. As is different from the working method of applying a heat-dissipating agent to separate LDs 10 juxtaposed, which had previously been employed, the heat-dissipating agent is applied to the light-emitting portion 12, etc., of the frame LD 10 in such an assembly state that the frame LD 10 and the leaf spring 30 are fixedly mounted on the laser holder 20 after the thermosetting/thermoplastic adhesive is applied and fixed in such an assembled state that the frame LD 10 and the leaf spring 30 have completely been mounted in the housing room 29 of the laser holder 20, thereby improving workability of the heat-dissipating agent application to the frame LD 10.

The OPU 1 includes the mounting structure for the optical member 10 or the mounting structure for the LD 10. The OPU 1 is configured such that the optical member 10 is mounted on the holding member 20 with the optical member 10 being reliably positioned using the elastic position adjustment member 30. Specifically, the OPU 1 is configured such that the LD 10 is mounted on the laser holder 20 with the LD 10 being reliably positioned using the leaf spring 30.

The optical disc apparatus 300 includes the OPU 1 having the mounting structure for the optical member 10 or the mounting structure for the LD 10.

The optical disc apparatus 300 is configured including the OPU 1 in which the optical member 10 is mounted on the holding member 20 with the optical member 10 being reliably positioned using the elastic position adjustment member 30. Specifically, the optical disc apparatus 300 is configured including the OPU 1 in which the LD 10 is mounted on the laser holder 20 with the LD 10 being reliably positioned using the leaf spring 30.

The optical disc apparatus 300 includes: a tray (not shown) on which an optical disc M can be mounted and which can be moved in and out with respect to an optical disc apparatus body 310; a clamp device which has a turntable 460 and a clamper (not shown) confronting the turntable 460 and which is capable of clamping the optical disc M to be fixed; a driving device 450 which drives to rotate the optical disc M together with the turntable 460; the OPU 1 which apply laser light onto the optical disc M; and the pair of slide shafts 410 and 420 which movably support the OPU 1 when the OPU 1 is moved along one radial direction D2 of the optical disc M.

The optical disc M is housed in the optical disc apparatus 300 using a substantially plate-shaped synthetic resin tray not shown which is capable of moving in and out with respect to a substantially rectangular box-shaped metal housing 400, i.e., the cover 400 making up the optical disc apparatus 300. The driving device 450 for rotating the optical disc M is housed in the cover 400 making up the optical disc apparatus 300. As the driving device 450, is the disc driving device 450 is used, which includes the turntable 460 made of synthetic resin and shaped into a substantially circular plate having the optical disc M mounted thereon. The cover 400 making up the optical disc apparatus 300 is provided with the OPU 1 that reads data/information/signals recorded in the optical disc M, records data/information/signals into the optical disc M, and deletes data/information/signals recorded in the optical disc M. An upper metal cover (not shown) is fitted on the lower metal cover 400 provided with various components, so as to make up the optical disc apparatus 300.

Using the clamping device provided with the turntable 460 and the clamper confronting the turntable 460, the optical disc M having a circular hole Mb formed at a center portion Mc thereof is positioned and securely clamped between the turntable 460 and the clamper and is removably fixed thereat. The turntable 460 provided on a spindle motor (not shown) of the driving device 450 has both functions of aligning the optical disc M and ensuring the stable high-speed rotation of the optical disc M.

The OPU 1 and the optical disc apparatus 300 including the OPU 1 can be used for a recording/reproducing apparatus that records data/information/signals etc., into the above various optical discs M and reproduces data/information/signals, etc., recorded in the various optical discs M. Specifically, the OPU 1 and the optical disc apparatus 300 including the OPU 1 can be used for a recording/reproducing/deleting-capable apparatus that records data/information/signals etc., into the various optical discs M, reproduces data/information/signals, etc., recorded in the various optical discs M, and deletes data/information/signals, etc., recorded in the various optical discs M. The OPU 1 and the optical disc apparatus 300 including the OPU 1 can also be used for a reproducing-only apparatus that reproduces data/information/signals, etc., recorded in the various optical discs M.

The OPU 1 is provided in the optical disc apparatus 300, which is mounted onto e.g., a computer, a audio/video equipment, a game machine, in-vehicle equipment, etc. (all not shown). The OPU 1 and the optical disc apparatus 300 including the OPU 1 can be provided in e.g., computers such as a notebook personal computer (PC), a laptop PC, a desktop PC, and an in-vehicle computer, in a game machine such as a computer game platform, and in audio and/or video equipment such as a CD player/CD recorder, a DVD player/DVD recorder, a "Blu-ray Disc" player/"Blu-ray Disc" recorder (all not shown). The OPU 1 is able to support a plurality of types of discs such as "CD"-type optical discs, "DVD-type optical discs, "HD DVD"-type optical discs, "CBHD-type optical discs, "Blu-ray Disc"-type optical discs, etc. The OPU 1 is able to support a single optical disc having a signal face portion including a plurality of layers. The OPU 1 can be provided in e.g., a computer, a audio and/or video equipment, a game machine, and an in-vehicle equipment that support various optical discs, such as "CD", "DVD", "HD DVD", "CBHD", and "Blu-ray Disc" (all not shown).

The above embodiments of the present invention are simply for facilitating the understanding of the present invention and are not in any way to be construed as limiting the present invention. The present invention may variously be changed or altered without departing from its spirit and encompass equivalents thereof.

For instance, an OPU (not shown) provided with a single OBL may be used in place of the OPU 1 provided with the two OBLs 110 and 120. For instance, the OPU (1) may not include any optical system corresponding to the third wavelength laser light so that the lens holder (90) can hold only the first OBL (110) as the OBL. The OPU (1) may not include any optical system corresponding to the first and the second wavelength laser light so that the lens holder (90) can hold only the second OBL (120) as the OBL. The OPU 1 may include optical systems corresponding to the first, second, and third wavelength laser lights so that the lens holder (90) can hold a single objective lens (not shown) that corresponds to the optical systems corresponding to the first, second, and third wavelength laser lights and that corresponds to three types of laser light, i.e. infrared wavelength range laser light, red wavelength range laser light, and blue-violet wavelength range laser light.

In the OPU 1 described above, the lens holder 90 holds the first OBL 110 for focusing the first and second wavelength laser light and the second OBL 120 for focusing the third wavelength laser light with the first 110 and the second 120 OBLs being disposed side by side substantially along the tangential direction D3 of the optical disc M, however, this is not limitative. For example, the lens holder (90) may hold the first OBL (110) for focusing the first and second wavelength laser lights and the second OBL (120) for focusing the third wavelength laser light with the first OBL (110) and second OBL (120) being disposed side by side substantially along the radial direction (D2), i.e. tracking direction (D2) of the optical disc M.

Instead of the LD 10 capable of emitting laser light of two different wavelengths, i.e. infrared laser light of "CD" standard having a wavelength of substantially 780 nm and red laser light of "DVD" standard having a wavelength of substantially 650 nm, a three-wavelength supporting LD (10) may be used that is capable of emitting the infrared laser light of "CD" standard having a wavelength of substantially 780 nm, red laser light of the "DVD" standard having a wavelength of substantially 650 nm, and blue-violet laser light of "HD DVD" standard, "CBHD" standard, "Blu-ray Disc" standard, etc., having a wavelength of substantially 405 nm. For instance, the LD 10 capable of emitting laser light of a plurality of different wavelengths may be replaced by an LD (not shown) capable of emitting laser light of a single wavelength.

For instance, the photodetector may include a light-receiving portion in a substantially rectangular shape in plan view having two substantially evenly split segments in a substantially rectangular shape in plan view, in place of the light-receiving portion in a substantially rectangular shape in plan view having four substantially evenly split segments in a substantially rectangular shape in plan view (all not shown). For instance, the photodetector may include polygonal light-receiving portions such as a main light-receiving portion in a substantially octagonal shape in plan view and a sub-light-receiving portion in a substantially octagonal shape in plan view, in place of the main light-receiving portion in a substantially square shape in plan view and the sub-light-receiving portion of a substantially square shape in plan view (all not shown). For instance, the four-split diffraction grating may be replaced by a plural-split diffraction grating such as a two-split diffraction granting or a three-split diffraction grating (all not shown).

What is claimed is:

1. A laser diode assembly for an optical pickup, comprising:
    a holding member having a housing cavity formed therein;
    a frame laser diode housed within the housing cavity; and
    a position adjustment member housed with the laser diode in the housing cavity and disposed between the laser diode and an inner wall of the housing cavity, the position adjustment member configured to adjust a mounting position of the laser diode within the housing cavity by abutting the inner wall and the laser diode.

2. The laser diode assembly of claim 1, wherein
    the laser diode is a substantially plate-shaped laser diode.

3. The laser diode assembly of claim 1, wherein
    the holding member is a holder configured to house the laser diode and the position adjustment member.

4. The laser diode assembly of claim 1, wherein
    the holding member is provided with a mounting facilitating member configured to facilitate mounting of the laser diode and the position adjustment member.

5. The laser diode assembly of claim 1, wherein
    the holding member is provided with a guide portion configured to facilitate mounting of the laser diode.

6. The laser diode assembly of claim 1, wherein
    the position adjustment member includes a spring corresponding to the laser diode.

7. The laser diode assembly of claim 1, wherein
    the position adjustment member abuts the laser diode three or more points.

8. The laser diode assembly of claim 1, wherein
    the position adjustment member is provided with a thrusting portion for thrusting the laser diode along one direction.

9. The laser diode assembly of claim 8, wherein
    the thrusting portion is so formed as to project in a substantially dog-leg shape along the one direction.

10. The laser diode assembly of claim 1, wherein
    the position adjustment member is provided with a mounting facilitating portion configured to facilitate mounting of the position adjustment member onto the holding member when at least the position adjustment member is mounted onto the holding member.

11. The laser diode assembly of claim 1, wherein
    the position adjustment member is provided with a guide portion configured to facilitate mounting of the position adjustment member onto the holding member when at least the position adjustment member is mounted onto the holding member.

12. A pickup apparatus including the laser diode assembly of claim 1.

13. A disc apparatus including the laser diode assembly of claim 1.

* * * * *

UNITED STATES PATENT AND TRADEMARK OFFICE
CERTIFICATE OF CORRECTION

PATENT NO. : 8,677,380 B2  
APPLICATION NO. : 12/840982  
DATED : March 18, 2014  
INVENTOR(S) : Akutsu et al.

Page 1 of 1

It is certified that error appears in the above-identified patent and that said Letters Patent is hereby corrected as shown below:

In the specification

Column 14, line 19: replace --amounting-- with "a mounting".

Signed and Sealed this  
Tenth Day of June, 2014

Michelle K. Lee  
*Deputy Director of the United States Patent and Trademark Office*